United States Patent
Lozhkin et al.

(10) Patent No.: US 7,313,191 B2
(45) Date of Patent: Dec. 25, 2007

(54) RECEIVER DEVICE OF COMMUNICATION SYSTEM

(75) Inventors: Alexander N. Lozhkin, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 490 days.

(21) Appl. No.: 11/093,974

(22) Filed: Mar. 30, 2005

(65) Prior Publication Data
US 2005/0169393 A1 Aug. 4, 2005

Related U.S. Application Data

(63) Continuation of application No. PCT/JP03/02537, filed on Mar. 5, 2003.

(51) Int. Cl.
*H04K 1/10* (2006.01)
(52) U.S. Cl. ............... 375/260; 375/262; 375/265; 375/285; 375/324; 375/340; 375/341; 375/346; 370/281; 370/344; 370/464; 714/792; 714/794; 714/795; 714/786
(58) Field of Classification Search ............... 375/260, 375/262, 265, 285, 324, 340, 341, 346, 147; 370/281, 344, 464; 714/792, 794, 795, 786
See application file for complete search history.

(56) References Cited

U.S. PATENT DOCUMENTS

| | | | |
|---|---|---|---|
| 5,933,464 A * | 8/1999 | Zogg | 375/343 |
| 6,088,407 A * | 7/2000 | Buternowsky et al. | 375/347 |
| 6,895,060 B2 * | 5/2005 | Kroeger et al. | 375/340 |

FOREIGN PATENT DOCUMENTS

| | | |
|---|---|---|
| JP | 2001-211088 | 8/2001 |
| JP | 2001-217724 | 8/2001 |
| WO | WO 2004/023685 | 3/2004 |
| WO | WO 2004/068756 | 8/2004 |

OTHER PUBLICATIONS

International Search Report dated Jun. 24, 2003.
K. Sathananthan et al. Probability of Error Calculation of OFDM Systems with Frequency Offset. IEEE Transactions on Communications pp. 1884-1888, vol. 49, No. 11, Nov. 2001.
Alexander N. Lozhkin. Performance Evaluation of Turbo-receiver for ICI Cancellation in OFDM-Based System. Fujitsu Laboratories, LTD. Mar. 19, 2003.

* cited by examiner

*Primary Examiner*—Mohammed Ghayour
*Assistant Examiner*—Leila Malek
(74) *Attorney, Agent, or Firm*—Katten Muchin Rosenman LLP

(57) ABSTRACT

Two correlation signals which are obtained by computing correlations between two reference signals and a reception signal are inputted to a level-0 cell, the reference signals being generated on the basis of combinations of crosstalk coefficients. A level-1 soft judgment target signal is produced by using soft judgment target signals that are outputted by two sets of level-0 cells respectively and, similarly, a level (N+1) cell is formed by using two sets of level-N cells, whereby a soft judgment target signal creation portion with a hierarchical structure is constituted. A judgment unit outputs a soft judgment value of the target subchannel on the basis of the soft judgment target signal that is outputted by the level (N+1) cell, and judges a reception signal.

8 Claims, 21 Drawing Sheets

RECEIVER DEVICE OF COMMUNICATION SYSTEM

CROSS-REFERENCE TO RELATED APPLICATION

This application is a continuation of International Application PCT/JP03/02537 filed on Mar. 5, 2003, now pending, the contents of which are herein wholly incorporated by reference.

BACKGROUND OF THE INVENTION

The present invention relates to a receiver device of a communication system and, more particularly, to a receiver device of a communication system that comprises a few subchannels such as DMT modulation and filterbank modulation subchannels, a multicarrier communication system, or a communication system in which a band is divided into independent narrow bands by means of multicarrier modulation in which each subband is independently modulated.

The bit error rate (BER) of a multicarrier communication system of filterbank modulation, DMT modulation or FMT modulation or the like can be improved by using a reception signal that includes distortion caused by Interchannel Interference (ICI). Interchannel interference ICI is produced as a result of a system malfunction or inevitable environment (loss of orthogonality between subchannels caused by a frequency offset or the like, for example) in a communication system, such as an OFDM-CDMA communication system, for example. This interchannel interference ICI arises due to leakage of spectral energy and, occasionally, leakage known as crosstalk between subchannels.

The turbo receiver of the present invention is based on a maximum posterior probability estimation algorithm that uses ICI. In this turbo receiver, information that is derived from a first subchannel following nonlinear processing refines the estimated maximum posterior probability of a second subchannel and, similarly, information that is derived from the second subchannel refines the estimated maximum probability of the first subchannel.

The main benefit of the turbo receiver of the present invention is that the behavior of ICI is treated as a zero average Gaussian distribution probability variable (the Gaussian approximation that is used in K. Sathananthan and C. Tellambura, "Probability of error calculation of OFDM system with frequency offset", IEEE Trans. Commun. Vol. 49, No. 11, Nov. 2001, pp1884-1888, for example) adopts a finite state discrete Markov process model. In the case of such an ICI model, a simple Gaussian approximation is thought to be more realistic due to the quality of ICI. The turbo receiver of the present invention is based on a maximum posterior probability estimation algorithm. In this turbo receiver, information that is derived from the first subchannel following nonlinear processing refines the estimated maximum posterior probability of the second subchannel and, similarly, information that is derived from the second subchannel refines the estimated maximum probability of the first subchannel.

In the event of a reception judgment for a target subchannel, the BER improves as the number of subchannels delivering the crosstalk to be considered increases. However, as the number of subchannels to be considered increases, the complexity of the algorithm increases and, as a result, a trade-off exists between the BER and the complexity. Therefore, the present invention proposes a general constitution for a turbo posterior algorithm for a multicarrier communication system, that is, a general constitution that makes it possible to eliminate complexity, in a case where there is mutual interference between N subchannels.

(a) Relationship Between Frequency Offset and ICI

In a multicarrier communication system in which a band is divided into a plurality of subbands that are independent narrow bands and the transmission data of each subband is sent and received after being frequency-multiplexed, that is, in a multicarrier communication system using filterbank modulation, DMT modulation, FMT modulation, or the like, the selection of a filter set has traditionally been executed under the constraints of complete removal of intersymbol interference (ISI) and interchannel interference (ICI) and so forth.

In an ideal transmission channel in which there is no Doppler shift, no offset frequency between the transmitter and receiver, and no signal distortion, the constraint is error-free recovery of the transmission symbol by the receiver. However, the frequency offset that is produced in each channel as a result of inaccurate tuning of the oscillator or a Doppler shift causes BER degradation caused by spectral leakage or ICI.

A unique method for alleviating such BER degradation renders the frequency offset as small as possible and, more specifically, estimates the frequency offset to be within 1% of the subcarrier frequency interval. However, this method necessitates a precise frequency offset estimation and, when a multicarrier signal mixed with noise is received, there is the problem that the precision of the frequency offset estimation is degraded when the noise level is large. In addition, this method does not operate properly in a high-speed fading channel, that is, in a high-speed fading channel in which the Doppler shift is not constant with respect to the transmission symbol and varies with time.

When there is one subchannel delivering crosstalk.

When there is one subchannel delivering crosstalk, if the frequency offset (frequency offset that is normalized by means of the channel interval) a is zero in OFDM, the transmission function (gain/frequency characteristic) of a first subchannel provides infinite attenuation at the center frequency $f_2$ of a second subchannel (dotted line) as shown by the solid line in FIG. 1. Further, the transmission function of the second subchannel similarly provides infinite attenuation at the center frequency $f_1$ of the first subchannel. That is, if the frequency offset a is zero, ICI is not produced between adjacent subchannels. In other words, if the frequency offset is zero, the subchannels are orthogonal and ICI does not exist at all.

However, if the frequency offset a is zero, each of the spectra of the adjacent subchannels indicates a non-zero mutual gain in the target subchannel as is clear for $a_1$, $a_2$ in FIG. 2. That is, as shown in FIG. 2, when the frequency offset is not zero, ICI (crosstalk) is produced between subchannels.

FIG. 3 is a general model for a multicarrier communication system in which ICI exists. 1 and 2 are transmitter devices of the subchannels ch1 and ch2; 3 and 4 are receiver devices of each of the subchannels; 5 and 6 are the transmission channels of the respective subchannels; 7 and 8 are multipliers that multiply the crosstalk coefficients $a_1$, $a_2$ by subchannel signals D1 and D2 respectively; 9 and 10 are synthesizers that synthesize the crosstalk (ICI) from another channel subchannel with their own subchannel signals; 11 and 12 are noise synthesizers. In FIG. 3, the data transmitted on the subchannels ch1 and ch2 are statistically independent (without correlation) and are written as the intersubchannel crosstalk coefficients (coupling coefficients) $a_1$ and $a_2$. As is clear from FIG. 3, the signal from the first subchannel is leaked to the second subchannel according to the coupling coefficient $a_1$ and the signal from the second subchannel is leaked to the first subchannel according to the coupling coefficient $a_2$.

When there are two subchannels delivering crosstalk

Consider a target subchannel, a first adjacent subchannel that is disposed below the target subchannel and a second adjacent subchannel that is disposed above the target subchannel. FIGS. 4 and 5 illustrate the frequency response of three subchannels in a case where the frequency offset is zero (FIG. 4) and a case where the frequency offset is not zero (FIG. 5).

The signals of the center frequencies $f_1$, $f_2$, and $f_3$ that correspond with the first, second and third subchannels respectively are indicated by the vertical arrows in FIGS. 4 and 5. In FIGS. 4 and 5, the subchannel number 0(ch0) indicates the target channel, the subchannel number −1(ch−1) indicates the subchannel that is located below the target subchannel on the frequency scale and the subchannel number +1(ch+1) indicates the subchannel that is located above the target channel on the frequency scale. Supposing that the cycle of a DMT symbol is T, the frequency scale is normalized with a channel interval equal to 1/T. That is, one unit of the frequency scale is a channel interval. As shown in FIG. 4, when the frequency offset (normalized with the channel interval) a is 0, the transmission function of the lower subchannel and the upper subchannel indicated by the solid line A and dashed line B in FIG. 4 respectively provides infinite attenuation at the center frequency $f_2$ of the target subchannel (dotted line C). Further, the transmission function of the target subchannel similarly provides infinite attenuation at the center frequencies $f_1$ and $f_3$ of the lower and upper subchannels. That is, if the frequency offset a is zero, ICI is not produced between adjacent channels. In other words, if the frequency offset is zero, the subchannels are orthogonal and ICI does not exist at all.

However, when the frequency offset a is not zero, the orthogonality of the subchannels breaks down and ICI is produced. FIG. 5 shows the spectral characteristic of each subchannel when the frequency offset a is not zero in the DMT system. Crosstalk from the subchannels Ch−1 and Ch+1 to the target subchannel Ch0 has a non-zero mutual gain that is denoted as $a_{-10}$ and $a_{10}$ in FIG. 5. In this notation, the first index of a denotes the subchannel constituting the interference source and the second index denotes the subchannel that is the interference target. As mentioned earlier, when the frequency offset a is not zero, non-zero mutual gain, that is, ICI (crosstalk) is produced between subchannels.

FIG. 6 is a general model serving to illustrate the mutual ICI of three subchannels in a DMT system with a frequency offset. $11_1$, $11_2$, and $11_3$ are the transmitter devices of the subchannels ch−1, ch0 and ch+1; $12_1$, $12_2$, and $12_3$ are receiver devices of the respective subchannels; $13_1$, $13_2$, and $13_3$ are transmission channels of the respective subchannels; $14_{ij}$ is a multiplier that multiplies a transmission coefficient (interference coefficient) $a_{ij}$ for leakage from a number-i subchannel to a number-j subchannel by a subchannel signal Di; $15_1$, $15_2$, and $15_3$ are synthesizers that synthesize crosstalk (ICI) from another subchannel with their own subchannel signals; and $16_1$, $16_2$, and $16_3$ are noise synthesizers.

As is clear from FIG. 6, the signal from the lower subchannel ch−1 leaks to the target subchannel ch0 via the crosstalk coefficient $a_{-10}$ and the signal from the upper subchannel ch+1 leaks to the target subchannel via the crosstalk coefficient $a_{10}$. Further, the noise components that are written as $n_1(t)$, $n_2(t)$, and $n_3(t)$ in FIG. 3 are statistically independent (without correlation) due to the frequency orthogonality between the subchannels.

When there are four subchannels delivering crosstalk

Consider a target subchannel, two adjacent subchannels that are disposed below the target subchannel and two adjacent subchannels that are disposed above the target subchannel. FIGS. 7 and 8 illustrate the frequency response of five subchannels Ch−2 to Ch+2 in a case where the frequency offset is zero (FIG. 7) and in a case where the frequency offset is not zero (FIG. 8).

The signals at the center frequencies $f_1$ to $f_5$ that correspond with the first to fifth subchannels respectively are indicated by the vertical arrows in FIGS. 7 and 8. In FIGS. 7 and 8, the subchannel number Ch0 denotes the target channel. When a is 0, the transmission function of the other subchannel provides infinite attenuation at the center frequency $f_3$ of the target subchannel Ch0. In other words, if the frequency offset is zero, the subchannels are orthogonal and ICI does not exist at all.

However, when the frequency offset a is zero, the orthogonality of the subchannels breaks down and ICI is produced. FIG. 8 shows the spectral characteristic of each subchannel when the frequency offset a is not zero in the DMT system. Crosstalk from the subchannels Ch−2, Ch−1, Ch+1, and Ch+2 to the target subchannel Ch0 has a non-zero mutual gain that is denoted as $a_{-20}$ $a_{-10}$, $a_{10}$ and $a_{20}$ in FIG. 8.

FIG. 9 is a general model serving to illustrate the mutual ICI of five subchannels in a DMT system with a frequency offset. $21_1$ to $21_5$ are transmitter devices of the subchannels ch−2 to ch+2; $22_1$ to $22_5$ are receiver devices of the respective subchannels; $23_1$ to $23_5$ are transmission channels of the respective subchannels; $24_{ij}$ is a multiplier that multiplies a transmission coefficient (interference coefficient) $a_{ij}$ for leakage from a number-i subchannel to a number-j subchannel by a subchannel signal Di; $25_1$ to $25_5$ are synthesizers that synthesize crosstalk (ICI) from another subchannel with their own subchannel signals; and $26_1$ to $26_5$ are noise synthesizers.

As is clear from FIG. 9, the signals from the lower subchannels ch−2 and ch−1 leak to the target subchannel ch0 via the crosstalk coefficients $a_{-20}$ and $a_{-10}$ and the signals from the upper subchannels ch+2 and ch+1 leak to the target subchannel via the crosstalk coefficients $a_{10}$ and $a_{20}$. Further, the noise components that are written as $n_1(t)$ to $n_5(t)$ in FIG. 9 are statistically independent (without correlation) due to the frequency orthogonality between the subchannels.

(b) Technical Problems

As mentioned earlier, even when ICI is produced, it is necessary to be able to determine correctly the values (code in the case of binary numbers) of the reception signals and transmission information symbols of each subchannel. For this reason, the present inventors propose a receiver device (turbo receiver) that implements a turbo posterior algorithm to enhance BER by using ICI when there is one subchannel delivering crosstalk to the target subchannel (ICI-2 case) and when there are two subchannels (ICI-3 case). Further, although the BER can be improved as the number of subchannels to be considered is increased, the algorithm grows complicated and the constitution of the turbo receiver implementing the algorithm becomes complex. That is, a trade-off exists between BER and the number of subchannels to be considered and there are limitations in enhancing BER by adding the number of subchannels to be considered.

SUMMARY OF THE INVENTION

Based on the above description, an object of the present invention is to be able to implement a receiver device (turbo receiver) that implements a turbo posterior algorithm by means of a simple constitution even when there is an increase in the number of subchannels to be considered.

An object of the present invention is to implement a turbo receiver simply even when there is an increase in the number of subchannels to be considered by creating cells and connecting the cells hierarchically.

In the case of the turbo receiver of the present invention, a correlator inputs to a level-0 cell two correlation signals, which are obtained by computing correlations between two reference signals and a reception signal of a target subchannel respectively, the reference signals being generated on the basis of combinations of crosstalk coefficients that express crosstalk from another subchannel. A level-1 cell is formed such that a level-1 soft judgment target signal is produced by using a soft judgment target signal that is outputted by each of two sets of level-0 cells and the soft judgment target signal is corrected by means of a soft judgment value of another subchannel excluding the target subchannel. Thereafter, similarly, a soft judgment target signal creation portion with a hierarchical structure is constituted by forming a level (N+1) cell by using two sets of level-N cells. A judgment unit outputs a soft judgment value of the target subchannel by using the soft judgment target signal outputted by the level (N+1) cell and judges the reception signal of the target subchannel on the basis of the soft judgment value.

The present invention makes it possible to implement a turbo receiver simply only by determining the number of levels of a soft judgment target signal creation portion in accordance with the number of crosstalk subchannels to be considered and then establishing the cells in a hierarchy.

BRIEF DESCRIPTION OF THE DRAWINGS

DESCRIPTION OF THE PREFERRED EMBODIMENTS (A) When there is One Subchannel Delivering Crosstalk (a) Overall Constitution of Communication System FIG. 10 is an overall constitutional view of a communication system that demodulates reception data by using interference between two adjacent subchannels. The communication system comprises two transmitter portions 31 and 32 that transmit data independently via adjacent subchannels ch1 and ch2 respectively, two receiver devices 40 and 50 that are provided in each subchannel, receive data from the corresponding subchannel and perform a soft judgment of the reception data, and means 60 for inputting a soft judgment target value for each receiver device to the other receiver device. The first receiver device 40 (50) uses the soft judgment target value thus inputted by the other receiver device 50 (40) to adjust its own soft judgment target value and judges "0" and "1" of the reception data on the basis of the soft judgment target value. Further, as the characteristic of the transmission channel, a first crosstalk path with a coupling coefficient $a_1$ from the first subchannel ch1 to the second subchannel ch2 and a second crosstalk path from the second subchannel ch2 to the first subchannel ch1 exist and are represented by the codes $34_1$ and $34_2$. In addition, the ICI signal and noise are synthesized during transmission, the parts performing the synthesis being represented by the codes $35_1$ to $35_2$ and $36_1$ to $36_2$.

(b) Algorithm for Received Symbol Demodulation

Figure 10:
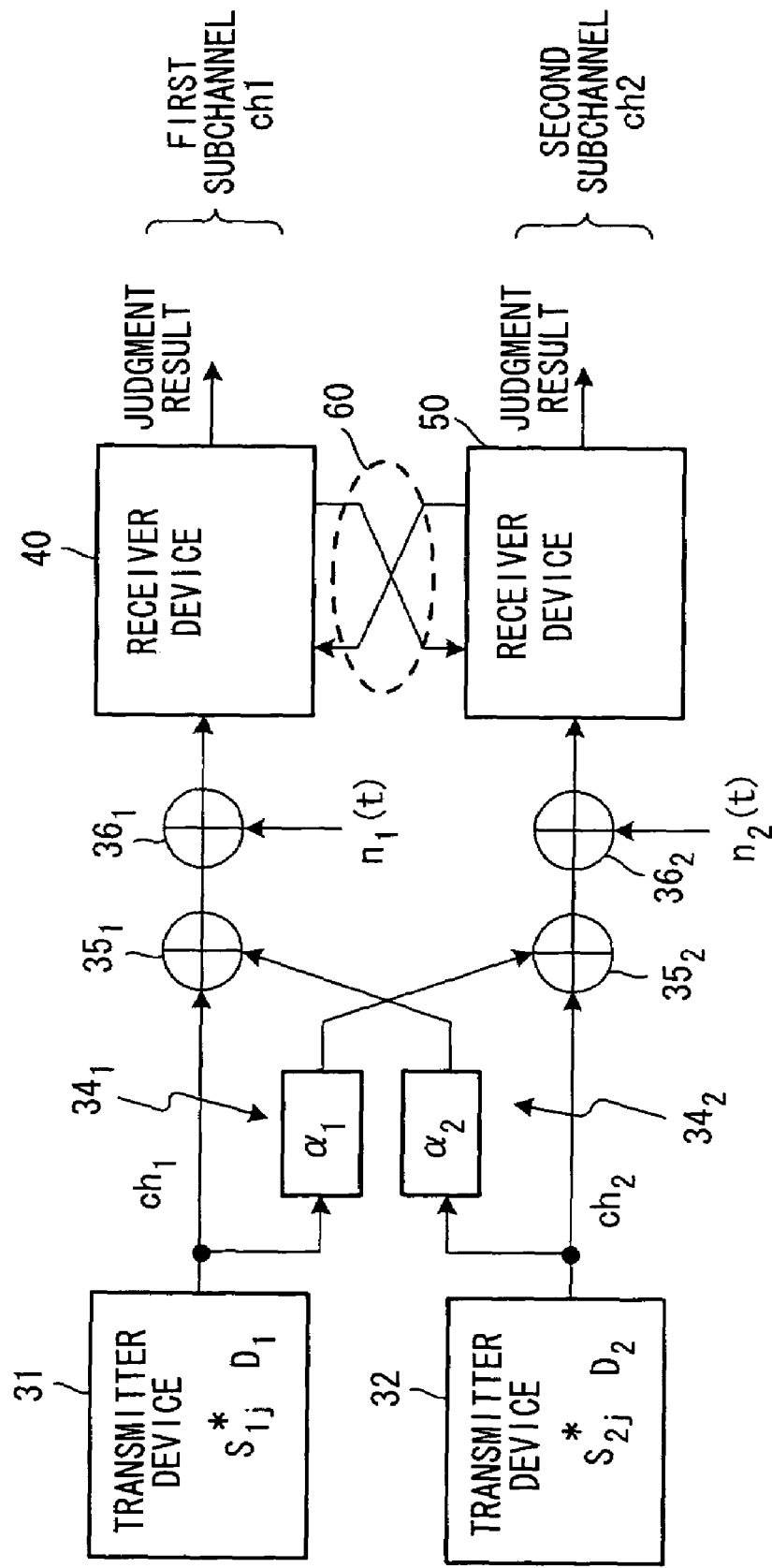
FIG. 10 is an overall constitutional view of a communication system that demodulates reception data by using interference between two adjacent subchannels.

The algorithm whereby the receivers of the first and second subchannels in the communication system shown in FIG. 10 demodulate the received symbols will now be described.

The principle behind the demodulation algorithm is to derive the values $P_1$ and $P_2$ indicating the difference between the posterior probability that the information symbol received on the first and second subchannels will be "0" (=+1) and the posterior probability that this information symbol will be "1" (=−1). This is because, if the difference $P_1$, $P_2$ in the posterior probability above can be derived, it can be judged whether the received information symbol is "0" or "1". That is, because the probability difference $P_1$ of the first subchannel is the difference between the posterior probability that the received information symbol will be "0" (=+1) and the posterior probability that the received information symbol will be "1" (=−1) it can be judged that if $P_1 > 0$, the received information of the first subchannel is "0" and if $P_1 < 0$, the received information of the first subchannel is "1". Further, similarly, because the probability difference $P_2$ is the difference between the posterior probability that the received information symbol of the second subchannel will be "0" (=+1) and the posterior probability that the received information symbol of the second subchannel will be "1" (=−1) it can be judged that if $P_2 > 0$, the received information of the second subchannel is "0" and if $P_2 < 0$, the received information of the second subchannel is "1". The values $P_1$, $P_2$ indicating the differences in the posterior probability are first derived from the above judgments.

Suppose that binary information (twin-value information) is transmitted as the signal $S^*_{ij}(t)$ via the first and second subchannels. Further, the index i of $S^*_{ij}(t)$ denotes the subchannel number (i=1, 2) and the index j is determined from the code of the information symbol Di of the subchannel i. That is, if $Di=+1, j=0$ and if $Di=-1, j=1$ (1).

Thereafter, in order to simplify the notation, the time dependency $S^*_{ij}(t)$ is omitted from Equation (1). That is, $S^*_{ij}(t)$ is written as $S^*_{ij}$.

Suppose that the transmission information symbols $D_1$ and $D_2$ are statistically independent (without correlation) and are equally distributed probability variables. Based on FIG. 10, a signal under the influence of ICI in the inputs of the first and second receivers 40 and 50 respectively is expressed as the linear coupling of the signals $S^*_{1j}$ and $S^*_{2j}$ (j=0, 1) that are transmitted on the first and second subchannels.

$$\begin{cases} S_{10} = S^*_{10} + \alpha_2 \cdot S^*_{20}, D_1 = +1, D_2 = +1 \\ S_{11} = S^*_{10} + \alpha_2 \cdot S^*_{21}, D_1 = +1, D_2 = -1 \\ S_{12} = S^*_{11} + \alpha_2 \cdot S^*_{20}, D_1 = -1, D_2 = +1 \\ S_{13} = S^*_{11} + \alpha_2 \cdot S^*_{21}, D_1 = -1, D_2 = -1 \end{cases} \quad (2)$$

$$\begin{cases} S_{20} = S^*_{20} + \alpha_1 \cdot S^*_{10}, D_2 = +1, D_1 = +1 \\ S_{21} = S^*_{20} + \alpha_1 \cdot S^*_{11}, D_2 = +1, D_1 = -1 \\ S_{22} = S^*_{21} + \alpha_1 \cdot S^*_{10}, D_2 = -1, D_1 = +1 \\ S_{23} = S^*_{21} + \alpha_1 \cdot S^*_{11}, D_2 = -1, D_1 = -1 \end{cases}$$

Following the introduction of ICI, $S_{ij}$ (i=1, 2; j=0, 1, 2, 3) is used for four signals of the inputs of the receivers of each of the subchannels in accordance with Equation (2). The initial index i of $S_{ij}$ in Equation (2) denotes the subchannel number and the second index j denotes the signal number that is determined by pairing the symbols D1 and D2 of the first and second subchannels respectively.

An algorithm for optimum reception can also be developed by considering (1) and (2) below. That is, an optimum reception algorithm can also be developed by considering the fact that (1) information signals have opposite codes and are $S^*_{10} = -S^*_{11}$ and $S^*_{20} = -S^*_{21}$ and (2) the same signals are used on the subchannels 1 and 2 to transmit information symbols, namely, $S^*_{10} = S^*_{20}$ and $S^*_{11} = S^*_{21}$.

The latter point (2) indicates that there is no difference relative to amplitude, waveform, energy, and so forth between the information signals of the first and second subchannels. In such a case, the signals of the Equation (2) of the respective subchannels are a pair as shown by the following equation and have opposite codes.

$$\begin{cases} S_{12} = -S^*_{10} - \alpha_2 \cdot S^*_{21} = -S_{11} \\ S_{13} = -S^*_{10} - \alpha_2 \cdot S^*_{20} = -S_{10} \end{cases} \quad (3)$$

$$\begin{cases} S_{22} = -S^*_{20} - \alpha_1 \cdot S^*_{11} = -S_{21} \\ S_{23} = -S^*_{20} - \alpha_1 \cdot S^*_{10} = -S_{20} \end{cases}$$

According to Equations (2) and (3), the posterior probability of receiving the signal $S_{ij}$, that is, the posterior probability $P(S_{ij}/y(t))$ that the reception signal will be $S_{ij}$ is given by the following equation:

$$P[S_{ij}/y(t)] = k_0 \cdot P_{apr}(S_{ij}) \cdot P(y(t)/S_{ij}) \quad (4)$$

$$= k_0 \cdot P_{apr}(S_{ij}) \cdot \exp\left\{-\frac{1}{N_0} \int_0^T [y(t) - S_{ij}]^2 \, dt\right\}$$

where $k_0$ is the normalization factor i is the subchannel number (i=1, 2), j is the signal number (j=0, 1, 2, 3);

y(t) is a synthesis signal synthesizing a signal array with ICI and White Gaussian noise n(t) with a spectral power intensity $N_o$ on an ith subchannel (y(t)=$S_{ij}$+n(t));

$P_{apr}(S_{ij})$ is the a priori probability of the reception signal $S_{ij}$;

$P(y(t)/S_{ij}$ is a conditional probability, i.e. the probability that, when the received word is y(t), the code word that is sent will be $S_{ij}$. The a priori probability $P_{apr}(S_{ij})$(j=0, 1, 2, 3) is expressed as the crossover product of two adjacent subchannels as indicated by Equation (5) according to Equations (2) and (3).

$$\begin{cases} P_{apr}(S_{10}) = P_{apr}(S^*_{10}) \cdot P(S^*_{20}) \\ P_{apr}(S_{11}) = P_{apr}(S^*_{10}) \cdot P(S^*_{21}) \\ P_{apr}(S_{12}) = P_{apr}(S^*_{11}) \cdot P(S^*_{20}) \\ P_{apr}(S_{13}) = P_{apr}(S^*_{11}) \cdot P(S^*_{21}) \end{cases} \quad (5)$$

$$\begin{cases} P_{apr}(S_{20}) = P_{apr}(S^*_{20}) \cdot P(S^*_{10}) \\ P_{apr}(S_{21}) = P_{apr}(S^*_{20}) \cdot P(S^*_{11}) \\ P_{apr}(S_{22}) = P_{apr}(S^*_{21}) \cdot P(S^*_{10}) \\ P_{apr}(S_{23}) = P_{apr}(S^*_{21}) \cdot P(S^*_{11}) \end{cases}$$

In Equation (5), the a priori probability $P_{apr}(S_{ij})$ is the a priori probability (transmission probability) that the number-j information signal $S_{ij}$ will be transmitted on the ith subchannel. Further, the a priori probability $P_{apr}(S^*_{ij})$ is dependent on the statistics of the data production source and, most realistically, may be assumed to be equal to ½. The probability $P(S^*_{ij})$ is the posterior probability of the reception signal $S^*_{ij}$ and is different from the a priori probability $P_{apr}(S^*_{ij})$. Thus, $P(S^*_{ij}) \sim P(S^*_{ij}/y(t))$. This is surely the best estimate of $P(S^*_{ij})$ on a white noise channel. As a result of this assumption, Equation (5) can be rewritten as follows.

$$\begin{cases} P_{apr}(S_{10}) = P_{apr}(S^*_{10}) \cdot P(S^*_{20}/y(t)) \\ P_{apr}(S_{11}) = P_{apr}(S^*_{10}) \cdot P(S^*_{21}/y(t)) \\ P_{apr}(S_{12}) = P_{apr}(S^*_{11}) \cdot P(S^*_{20}/y(t)) \\ P_{apr}(S_{13}) = P_{apr}(S^*_{11}) \cdot P(S^*_{21}/y(t)) \end{cases} \quad (6)$$

$$\begin{cases} P_{apr}(S_{20}) = P_{apr}(S^*_{20}) \cdot P(S^*_{10}/y(t)) \\ P_{apr}(S_{21}) = P_{apr}(S^*_{20}) \cdot P(S^*_{11}/y(t)) \\ P_{apr}(S_{22}) = P_{apr}(S^*_{21}) \cdot P(S^*_{10}/y(t)) \\ P_{apr}(S_{23}) = P_{apr}(S^*_{21}) \cdot P(S^*_{11}/y(t)) \end{cases}$$

Alternatively, when a direct relationship exists between the information signal $S^*_{ij}$ and the transmission information signal $D_i$ (See Equation (1)), substitution with $P(S^*_{ij}) \sim P(D_i=j/y(t))$ in Equation (5) can be performed and Equation (6) can be expressed by the following equation. Further, $P(S^*_{ij})$ is the probability that the ith subchannel signal $D_i$ is j and that a direct relationship exists between the information signal $S^*_{ij}$ and the transmission information signal $D_i$.

$$\begin{cases} P_{apr}(S_{10}) = P_{apr}(S^*_{10}) \cdot P(D_2 = +1/y(t)) \\ P_{apr}(S_{11}) = P_{apr}(S^*_{10}) \cdot P(D_2 = -1/y(t)) \\ P_{apr}(S_{12}) = P_{apr}(S^*_{11}) \cdot P(D_2 = +1/y(t)) \\ P_{apr}(S_{13}) = P_{apr}(S^*_{11}) \cdot P(D_2 = -1/y(t)) \end{cases} \quad (7)$$

$$\begin{cases} P_{apr}(S_{20}) = P_{apr}(S^*_{20}) \cdot P(D_1 = +1/y(t)) \\ P_{apr}(S_{21}) = P_{apr}(S^*_{20}) \cdot P(D_1 = -1/y(t)) \\ P_{apr}(S_{22}) = P_{apr}(S^*_{21}) \cdot P(D_1 = +1/y(t)) \\ P_{apr}(S_{23}) = P_{apr}(S^*_{21}) \cdot P(D_1 = -1/y(t)) \end{cases}$$

In Equation (7), the a priori probability $P_{apr}(S_{ij})$ (i=0, 1; j=0, 1, 2, 3) (left side) of the reception signal $S_{ij}$ on the ith subchannel is expressed by the crossover channel product (right side) between the transmission a priori probability $P_{apr}(S^*_{ij})$ of the information signal $S^*_{ij}$ of the ith subchannel and the posterior probability that the information symbol D received on an adjacent channel will be +1 or −1.

In the turbo receiver (maximum likelihood receiver), the code of the received information symbol $D_i$ of the ith subchannel is determined as follows. That is, the probability $P(D_i=+1/y(t))$ that the received information symbol $D_i$ of the ith subchannel will be +1 and the probability $P(D_i=-1/y(t))$ that the received information symbol $D_i$ will be −1 are each found and, by comparing the size of these probabilities or comparing a threshold value with the difference between the logarithms for the probabilities, the code of the received information symbol $D_i$ is determined.

The posterior probability $P(D_i=j/y(t))$ that the received information symbol $D_i$ of the ith subchannel is j can be obtained as the posterior probability of receiving a signal for which $D_i$ is j. Therefore, the posterior probability $P(D_1=+1/y(t))$ that the received information symbol $D_1$ of the first subchannel is "0" (=+1) can be found as follows. That is, because, according to Equations (1) and (2), the signals that transmit the information symbol "0" (=+1) on the first subchannel are $S_{10}$ and $S_{11}$, the posterior probability $P(D_1=+1/y(t))$ that the received information symbol $D_1$ of the first subchannel will be "0" (=+1) is the sum of the posterior probabilities of receiving the signals $S_{10}$ and $S_{11}$ and can be found by means of Equation (8a). Likewise, the posterior probability $P(D_1=-1/y(t))$ that the received information symbol $D_1$ of the first subchannel will be "1" (=−1) can be found by means of Equation (8b).

$$\begin{cases} P(D_1 = +1/y(t)) = [P(S_{10}/y(t)) + P(S_{11}/y(t))] & (8a) \\ P(D_1 = -1/y(t)) = [P(S_{12}/y(t)) + P(S_{13}/y(t))] & (8b) \end{cases}$$

When Equation (4) is applied to (8a) and (8b) (where $k_0=1$)

$$\begin{cases} P(D_1 = +1/y(t)) = [P_{apr}(S_{10}) \cdot P(y(t)/S_{10}) + P_{apr}(S_{11}) \cdot P(y(t)/S_{11})] & (9a) \\ P(D_1 = -1/y(t)) = [P_{apr}(S_{12}) \cdot P(y(t)/S_{12}) + P_{apr}(S_{13}) \cdot P(y(t)/S_{13})] & (9b) \end{cases}$$

In addition, equation (10) is derived when Equation (7) is substituted in (9a) and (9b).

$$\begin{cases} P(D_1 = +1/y(t)) = [P_{apr}(S^*_{10}) \cdot P(D_2 \\ \qquad = +1/y(t)) \cdot P(y(t)/S_{10}) + P_{apr}(S^*_{10}) \cdot P(D_2 \\ \qquad = -1/y(t)) \cdot P(y(t)/S_{11})] \\ P(D_1 = -1/y(t)) = [P_{apr}(S^*_{11}) \cdot P(D_2 \\ \qquad = +1/y(t)) \cdot P(y(t)/S_{12}) + P_{apr}(S^*_{11}) \cdot P(D_2 \\ \qquad = -1/y(t)) \cdot P(y(t)/S_{13})] \end{cases} \quad (10)$$

Although a case involving the first subchannel was described hereinabove, the same is also true for the second subchannel. The posterior probabilities $P(D_21=+1/y(t))$ and $P(D_2=-1/y(t))$ that the received information symbol $D_2$ of the second subchannel will be "0" (=+1) and "1" (=−1) respectively can be found by means of Equations (11a) and (11b) to (13) below.

$$\begin{cases} P(D_2 = +1/y(t)) = [P(S_{20}/y(t)) + P(S_{21}/y(t))] & (11a) \\ P(D_2 = -1/y(t)) = [P(S_{22}/y(t)) + P(S_{23}/y(t))] & (11b) \end{cases}$$

$$\begin{cases} P(D_2 = +1/y(t)) = [P_{apr}(S_{20}) \cdot P(y(t)/S_{20}) + P_{apr}(S_{21}) \cdot P(y(t)/S_{21})] & (12a) \\ P(D_2 = -1/y(t)) = [P_{apr}(S_{22}) \cdot P(y(t)/S_{22}) + P_{apr}(S_{23}) \cdot P(y(t)/S_{23})] & (12b) \end{cases}$$

$$\begin{cases} P(D_2 = +1/y(t)) = [P_{apr}(S^*_{20}) \cdot P(D_1 \\ \qquad = +1/y(t)) \cdot P(y(t)/S_{20}) + P_{apr}(S^*_{20}) \cdot P(D_1 \\ \qquad = -1/y(t)) \cdot P(y(t)/S_{21})] \\ P(D_2 = -1/y(t)) = [P_{apr}(S^*_{21}) \cdot P(D_1 \\ \qquad = +1/y(t)) \cdot P(y(t)/S_{22}) + P_{apr}(S^*_{21}) \cdot P(D_1 \\ \qquad = -1/y(t)) \cdot P(y(t)/S_{13})] \end{cases} \quad (13)$$

If, based on the above equations, the posterior probabilities $P(D_1=+1/y(t))$ and $P(D_1=-1/y(t))$ that the received information symbol $D_1$ of the first subchannel will be "0" (=+1) and "1" (=−1) respectively and the posterior probabilities $P(D_2=+1/y(t))$ and $P(D_2=-1/y(t))$ that the received information symbol $D_2$ of the second subchannel will be "0" (=+1) and "1" (=−1) respectively, and, by comparing the size of these probabilities or comparing a threshold value with the difference between the logarithms for the probabilities, the code (+1 or −1) of the received information symbol can be determined.

Judgment from Size Comparison

The determination of whether the information symbol $D_1$ of the first subchannel is +1 or −1 is made by first calculating $$\frac{P(D_1 = +1/y(t))}{P(D_1 = -1/y(t))}$$

and then performing a judgment by means of Equations (14a) and (14b). That is, if $$\frac{P(D_1 = +1/y(t))}{P(D_1 = -1/y(t))} > 1 \tag{14a}$$

is satisfied, it is judged that $D_1=+1$ and, if $$\frac{P(D_1 = +1/y(t))}{P(D_1 = -1/y(t))} < 1 \tag{14b}$$

is satisfied, it is judged that $D_1=-1$.

Similarly, the determination of whether the information symbol $D_2$ of the second subchannel is +1 or −1 is made by first calculating $$\frac{P(D_2 = +1/y(t))}{P(D_2 = -1/y(t))}$$

and then performing a judgment by means of Equations (14c) and (14d). That is, if $$\frac{P(D_2 = +1/y(t))}{P(D_2 = -1/y(t))} > 1 \tag{14c}$$

is satisfied, it is judged that $D_2=+1$ and, if $$\frac{P(D_2 = +1/y(t))}{P(D_2 = -1/y(t))} < 1 \tag{14d}$$

is satisfied, it is judged that $D_2=-1$.

Judgment of Logarithm Difference

The determination of whether the information symbol $D_1$ of the first subchannel is +1 or −1 is made by first calculating ln ln $P(D_1=+1/y(t))$−ln $P(D_1=-1/y(t))$ (where ln is an e-based logarithm) and then performing a judgment based on whether the calculated values are positive or negative. That is, if $$\ln P(D_1=+1/y(t)) - \ln P(D_1=-1/y(t)) > 0 \tag{15a},$$

it is judged that $$D_1=+1 \text{ and, if } \ln P(D_1=+1/y(t)) - \ln P(D_1=-1/y(t)) < 0 \tag{15b}$$

it is judged that $D_1=-1$. Similarly, the determination of whether the information symbol $D_2$ of the second subchannel is +1 or −1 is made by first calculating $$\ln P(D_2=+1/y(t)) - \ln P(D_2=-1/y(t))$$

and then performing a judgment based on whether the calculated values are positive or negative. That is, if $$\ln P(D_2=+1/y(t)) - \ln P(D_2=-1/y(t)) > 0 \tag{15c},$$

it is judged that $D_2=+1$ and, in the case of $$\ln P(D_2=+1/y(t)) - \ln P(D_2=-1/y(t)) < 0 \tag{15d},$$

it is judged that $D_2=-1$.

Further, the following equation is established from the fact that the transmission symbols $D_i$ are statistically independent (without correlation) and are equally distributed probability variables.

$$\begin{cases} P_{apr}(S_{10}^*) = P_{apr}(S_{11}^*) = 1/2 \\ P_{apr}(S_{20}^*) = P_{apr}(S_{21}^*) = 1/2 \end{cases} \tag{16}$$

Based on Equation (16), Equations (10) and (13) become Equations (17) and (18).

$$\begin{cases} P(D_1 = +1/y(t)) = 1/2[P(D_2 = +1/y(t)) \cdot \\ P(y(t)/S_{10}) + P(D_2 = -1/y(t)) \cdot P(y(t)/S_{11})] \\ P(D_1 = -1/y(t)) = 1/2[P(D_2 = +1/y(t)) \cdot \\ P(y(t)/S_{12}) + P(D_2 = -1/y(t)) \cdot P(y(t)/S_{13})] \end{cases} \tag{17}$$

$$\begin{cases} P(D_2 = +1/y(t)) = 1/2[P(D_1 = +1/y(t)) \cdot \\ P(y(t)/S_{20}) + P(D_1 = -1/y(t)) \cdot P(y(t)/S_{21})] \\ P(D_2 = -1/y(t)) = 1/2[P(D_1 = +1/y(t)) \cdot \\ P(y(t)/S_{22}) + P(D_1 = -1/y(t)) \cdot P(y(t)/S_{13})] \end{cases} \tag{18}$$

When Equations (17) and (18) are applied to the judgment equations of Equations (14a) to (14d) and the y(t) notation in $P(D_i=\pm 1/y(t))$ is omitted, the judgment equation for the first subchannel becomes Equation (19):

$$\begin{aligned} P_1 &= \ln P(D_1 = +1/y(t)) - \ln P(D_1 = -1/y(t)) \\ &= \ln[P(D_2 = +1) \cdot P(y(t)/S_{10}) + P(D_2 = -1) \cdot P(y(t)/S_{11})] - \\ &\quad \ln[P(D_2 = +1) \cdot P(y(t)/S_{12}) + P(D_2 = -1) \cdot P(y(t)/S_{13})] \end{aligned} \tag{19}$$

and the judgment equation for the second subchannel becomes Equation (20):

$$\begin{aligned} P_2 &= \ln P(D_2 = +1/y(t)) - \ln P(D_2 = -1/y(t)) \\ &= \ln[P(D_1 = +1) \cdot P(y(t)/S_{20}) + P(D_1 = -1) \cdot P(y(t)/S_{21})] - \\ &\quad \ln[P(D_1 = +1) \cdot P(y(t)/S_{22}) + P(D_1 = -1) \cdot P(y(t)/S_{23})] \end{aligned} \tag{20}$$

Here, Equations (22) to (25) each of which is shown below are produced when the first and second terms on the right-hand side of Equations (19) and (20) are modified by considering the algebraic uniformity of the following equation:

$$\ln(e^X + e^Y) = \frac{X+Y}{2} + \ln 2 + \ln\cosh\left(\frac{X-Y}{2}\right) \quad (21)$$

However, suppose that the energy of the signal $S_{ij}$ is $E_{sij}$ and $$E_{Sij} = E_{Sij} = \int_0^T S_{ij}^2(t)dt.$$

For example, equation (22) is found as follows. First, when Equation (21) is applied to the first term of the right-hand side of Equation (19), $$e^X = P(D_2=+1) \cdot P(y(t)/S_{10})$$

$$e^Y = P(D_2=-1) \cdot P(y(t)/S_{11})$$

Calculating the logarithms of both sides of the above equations gives:

$$X = \ln P(D_2=+1) + \ln P(y(t)/S_{10})$$

$$Y = \ln P(D_2=-1) + \ln P(y(t)/S_{11})$$

If Equation (4) is considered by means of the above equations, $$\left(P(y(t)/S_{ij}) = \exp\left\{-\frac{1}{N_0}\int_0^T [y(t) - S_{ij}]^2 dt\right\}\right),$$

X and Y are found and, if X and Y are substituted in the right-hand side of Equation (21), Equation (22) is obtained. Similarly, Equations (23) to (25) are obtained.

$$\ln P(D_1 = +1/y(t)) = \ln(P(D_2 = +1) \cdot P(y(t)/S_{10}) + \quad (22)$$
$$P(D_2 = -1) \cdot P(y(t)/S_{11}))$$
$$= 1/2 \cdot \left(\ln P(D_2 = +1) - \frac{1}{N_0}\int_0^T y^2(t)dt + \right.$$
$$\left. \frac{2}{N_0}\int_0^T y(t) \cdot S_{10}(t)dt - \frac{E_{S_{10}}}{N_0}\right) +$$
$$1/2 \cdot \left(\ln P(D_2 = -1) - \frac{1}{N_0}\int_0^T y^2(t)dt + \right.$$
$$\left. \frac{2}{N_0}\int_0^T y(t) \cdot S_{11}(t)dt - \frac{E_{S_{11}}}{N_0}\right) +$$
$$\ln\cosh\left\{\frac{1}{2} \cdot (\ln P(D_2 = +1) + \right.$$
$$\frac{2}{N_0}\int_0^T y(t) \cdot S_{10}(t)dt - \frac{E_{S_{10}}}{N_0}) -$$
$$\frac{1}{2} \cdot (\ln P(D_2 = -1) +$$
$$\left. \frac{2}{N_0}\int_0^T y(t) \cdot S_{11}(t)dt - \frac{E_{S_{11}}}{N_0})\right\} + \ln 2$$

$$\ln P(D_1 = -1/y(t)) = \ln(P(D_2 = +1) \cdot P(y(t)/S_{12}) + \quad (23)$$
$$P(D_2 = -1) \cdot P(y(t)/S_{13}))$$
$$= 1/2 \cdot \left(\ln P(D_2 = +1) - \frac{1}{N_0}\int_0^T y^2(t)dt + \right.$$
$$\left. \frac{2}{N_0}\int_0^T y(t) \cdot S_{12}(t)dt - \frac{E_{S_{12}}}{N_0}\right) +$$
$$1/2 \cdot \left(\ln P(D_2 = -1) - \frac{1}{N_0}\int_0^T y^2(t)dt + \right.$$
$$\left. \frac{2}{N_0}\int_0^T y(t) \cdot S_{13}(t)dt - \frac{E_{S_{13}}}{N_0}\right) +$$
$$\ln\cosh\left\{\frac{1}{2} \cdot (\ln P(D_2 = +1) + \right.$$
$$\frac{2}{N_0}\int_0^T y(t) \cdot S_{12}(t)dt - \frac{E_{S_{12}}}{N_0}) -$$
$$\frac{1}{2} \cdot (\ln P(D_2 = -1) +$$
$$\left. \frac{2}{N_0}\int_0^T y(t) \cdot S_{13}(t)dt - \frac{E_{S_{13}}}{N_0})\right\} + \ln 2$$

$$\ln P(D_2 = +1/y(t)) = \ln(P(D_1 = +1) \cdot P(y(t)/S_{20}) + \quad (24)$$
$$P(D_1 = -1) \cdot P(y(t)/S_{21}))$$
$$= 1/2 \cdot \left(\ln P(D_1 = +1) - \frac{1}{N_0}\int_0^T y^2(t)dt + \right.$$
$$\left. \frac{2}{N_0}\int_0^T y(t) \cdot S_{20}(t)dt - \frac{E_{S_{20}}}{N_0}\right) +$$
$$1/2 \cdot \left(\ln P(D_1 = -1) - \frac{1}{N_0}\int_0^T y^2(t)dt + \right.$$
$$\left. \frac{2}{N_0}\int_0^T y(t) \cdot S_{21}(t)dt - \frac{E_{S_{21}}}{N_0}\right) +$$
$$\ln\cosh\left\{\frac{1}{2} \cdot (\ln P(D_1 = +1) + \right.$$
$$\frac{2}{N_0}\int_0^T y(t) \cdot S_{20}(t)dt - \frac{E_{S_{20}}}{N_0}) -$$
$$\frac{1}{2} \cdot (\ln P(D_1 = -1) +$$
$$\left. \frac{2}{N_0}\int_0^T y(t) \cdot S_{21}(t)dt - \frac{E_{S_{21}}}{N_0})\right\} + \ln 2$$

$$\ln P(D_2 = -1/y(t)) = \ln(P(D_1 = +1) \cdot P(y(t)/S_{22}) + \quad (25)$$
$$P(D_1 = -1) \cdot P(y(t)/S_{23}))$$
$$= 1/2 \cdot \left(\ln P(D_1 = +1) - \frac{1}{N_0}\int_0^T y^2(t)dt + \right.$$
$$\left. \frac{2}{N_0}\int_0^T y(t) \cdot S_{22}(t)dt - \frac{E_{S_{22}}}{N_0}\right) +$$
$$1/2 \cdot \left(\ln P(D_1 = -1) - \frac{1}{N_0}\int_0^T y^2(t)dt + \right.$$
$$\left. \frac{2}{N_0}\int_0^T y(t) \cdot S_{23}(t)dt - \frac{E_{S_{23}}}{N_0}\right) +$$
$$\ln\cosh\left\{\frac{1}{2} \cdot (\ln P(D_1 = +1) + \right.$$

-continued $$\frac{2}{N_0}\int_0^T y(t)\cdot S_{22}(t)dt - \frac{E_{S_{22}}}{N_0}\Big) -$$

$$\frac{1}{2}\cdot\{\ln P(D_1 = -1) +$$

$$\frac{2}{N_0}\int_0^T y(t)\cdot S_{23}(t)dt - \frac{E_{S_{23}}}{N_0}\Big)\} + \ln 2$$

When Equations (22) and (23) are substituted in Equation (19), $P_1$, which is found from the judgment equation for the first subchannel, is as per the following equation. However, the facts established by Equation (28) are used.

$$\ln P_1 = \ln P(D_1 = +1) - \ln P(D_1 = -1) \quad (26)$$

$$= \frac{2}{N_0}\int_0^T y(t)\cdot(S_{10}(t)+S_{11}(t))dt + \ln\cosh\Big\{1/2\Big[\ln P_2 +$$

$$\frac{2}{N_0}\int_0^T y(t)\cdot(S_{10}(t)-S_{11}(t))dt - \frac{E_{S_{10}}-E_{S_{11}}}{N_0}\Big]\Big\} -$$

$$\ln\cosh\Big\{1/2\Big[\ln P_2 +$$

$$\frac{2}{N_0}\int_0^T y(t)\cdot(S_{10}(t)-S_{11}(t))dt + \frac{E_{S_{10}}-E_{S_{11}}}{N_0}\Big]\Big\} > / < 0$$

Further, when Equations (24) and (25) are substituted in Equation (20), $P_2$, which is found from the judgment equation for the second subchannel, is as per the following equations.

$$\ln P_2 = \ln P(D_2 = +1) - \ln P(D_2 = -1) \quad (27)$$

$$= \frac{2}{N_0}\int_0^T y(t)\cdot(S_{20}(t)+S_{21}(t))dt + \ln\cosh\Big\{1/2\Big[\ln P_1 +$$

$$\frac{2}{N_0}\int_0^T y(t)\cdot(S_{20}(t)-S_{21}(t))dt - \frac{E_{S_{20}}-E_{S_{21}}}{N_0}\Big]\Big\} -$$

$$\ln\cosh\Big\{1/2\Big[\ln P_1 + \frac{2}{N_0}\int_0^T y(t)\cdot(S_{20}(t)-S_{21}(t))dt -$$

$$\frac{E_{S_{20}}-E_{S_{21}}}{N_0}\Big]\Big\} > / < 0$$

where $$\begin{cases} S_{10}(t) = -S_{13}(t) \\ S_{11}(t) = -S_{12}(t) \end{cases} \begin{cases} E_{S_{10}} = E_{S_{13}} \\ E_{S_{11}} = E_{S_{12}} \end{cases} \quad (28)$$

$$\begin{cases} S_{20}(t) = -S_{23}(t) \\ S_{21}(t) = -S_{22}(t) \end{cases} \begin{cases} E_{S_{20}} = E_{S_{23}} \\ E_{S_{21}} = E_{S_{22}} \end{cases}$$

Equations (26) and (27) and Equations (2), (4), (14), and (15) employ adjacent channel judgment information when judging the code of the transmission information symbol D of a certain subchannel as known from Equations (26) and (27) for defining the optimum receiver structure of a binary signal with ICI. In the judgment equation of the first subchannel, the judgment information is written as $P_2$, and $P_2$ expresses the difference between the posterior probability that the information symbol of the second subchannel will be +1 and the posterior probability that the information symbol of the second subchannel will be −1. This is true for the second subchannel. That is, the judgment equation of Equation (27) employs the judgment information $P_1$ of the first subchannel. The judgment information $P_1$ expresses the difference between the posterior probability that the information symbol of the first subchannel will be +1 and the posterior probability that the information symbol of the first subchannel will be −1.

Based on the above, $P_1$ and $P_2$, which are soft judgment target values, are calculated by means of Equations (26) and (27) and then an algorithm is created to judge the "0" and "1" of the received symbols according to the negative or positive values of the soft judgment target values $P_1$ and $P_2$.

(c) Constitution of Receiver Device

Figure 11:
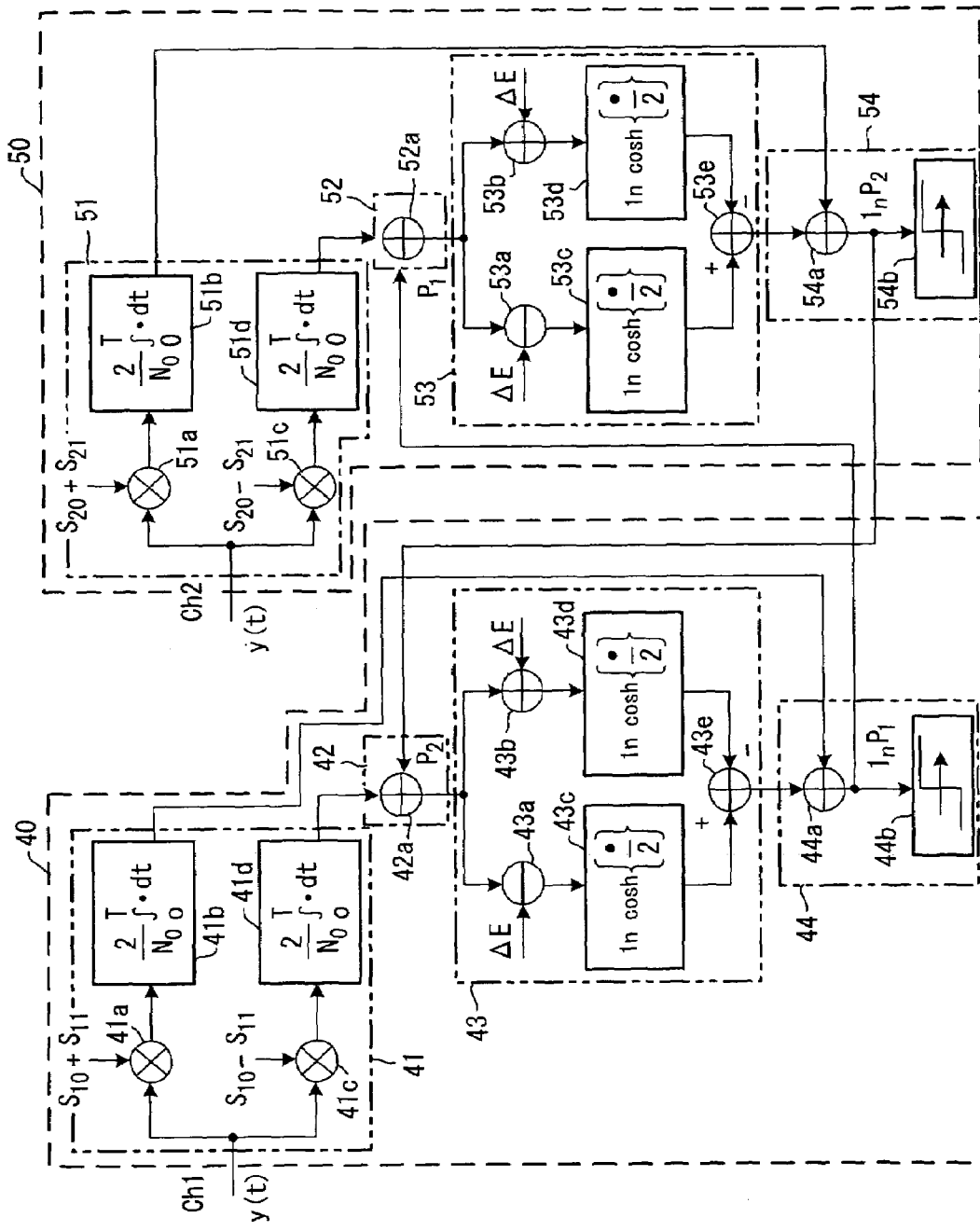
FIG. 11 is a constitutional view of a receiver device (ICI-2 turbo receiver) based on maximum posterior probability that utilizes ICI.

FIG. 11 is a constitutional view of a receiver device, that is, a receiver device (turbo receiver) based on maximum posterior probability that utilizes ICI that comprises a constitution for executing the algorithms above.

This turbo receiver comprises, for each subchannel, a receiver portion 40 for the first subchannel ch1 and a receiver portion 50 for the second subchannel ch2. These receiver portions 40 and 50 have the exact same constitution and the computation result lnP$_i$ of one channel affects the symbol judgment of the other channel.

In a broad classification, the receiver device 40 of the first subchannel ch1 comprises a correlation unit (matched filter is also acceptable) 41, an other-channel judgment result creation portion 42, a nonlinear unit 43, and a symbol judgment portion 44. The multiplier 41a and integrator 41b of the correlation unit 41 are parts that compute $$\frac{2}{N_0}\int_o^T y(t)\cdot(S_{10}(t)+S_{11}(t))dt$$

of the first term of the right-hand side of Equation (26), which is a judgment equation, and the multiplier 41c and integrator 41d are parts that compute the integration part $$\frac{2}{N_0}\int_o^T y(t)\cdot(S_{10}(t)-S_{11}(t))dt$$

of the second and third terms of the right-hand side of Equation (26), which is a judgment equation. The other-channel judgment result creation portion 42 comprises an adder 42a and computes $$\ln P_2 + \frac{2}{N_0}\int_o^T y(t)\cdot(S_{10}(t)-S_{11}(t))dt.$$

The nonlinear unit 43 is a part that computes ln cosh of the second and third terms of the right-hand side of Equation (26) and adders 43a and 43b compute the bracketed part [ ] of the second and third terms on the right-hand side of Equation (26), where $(E_{S10}-E_{S11})/N_0=\Delta E$. ln cosh processors 43c and 43d compute the second and third terms of the right-hand side of Equation (26) respectively and a subtractor 43e subtracts and outputs the computation result of the ln cosh processor 43d from the computation result of the ln cosh processor 43c.

The adder 44a of the symbol judgment portion 44 adds the output signal of the integration part 41b of the correlation unit 41 and the output signal of the nonlinear unit 43 to produce the computation result (soft judgment target value) lnP$_1$ of Equation (26). The judgment portion 44b judges whether the value of the computation result lnP$_1$ is positive or negative, judging that the received symbol is "0" if the value is positive and that the received symbol is "1" if the value is negative. Further, the symbol judgment portion 44 feeds back the computation result (soft judgment target value) lnP$_1$ of Equation (26) to an other-channel judgment result creation portion 52 of the receiver device 50 of the second subchannel.

On the other hand, the receiver device 50 of the second subchannel ch2 comprises a correlation unit 51, other-channel judgment result creation portion 52, a nonlinear unit 53, and a symbol judgment portion 54. Multiplier 51a and integrator 51b of the correlation unit 51 are parts that compute $$\frac{2}{N_0}\int_o^T y(t)\cdot(S_{20}(t)+S_{21}(t))dt$$

of the first term of the right-hand side of Equation (27), which is a judgment equation and multiplier 51c and integrator 51d are parts that compute $$\frac{2}{N_0}\int_o^T y(t)\cdot(S_{20}(t)-S_{21}(t))dt$$

of the second and third terms of the right-hand side of Equation (27), which is a judgment equation. The other-channel judgment result creation portion 52 comprises an adder 52a and computes $$\ln P_1 + \frac{2}{N_0}\int_o^T y(t)\cdot(S_{20}(t)-S_{21}(t))dt.$$

The nonlinear unit 53 is a part that computes ln cosh of the second and third terms of the right-hand side of Equation (27) and adders 53a and 53b compute the bracketed portion of the equation of the second and third terms of Equation (27), where $(E_{S20}-E_{S21})/N_0=\Delta E$. ln cosh processors 53c and 53d each compute the second and third terms of the right-hand side of Equation (27) and a subtractor 53e subtracts and outputs the computation result of the ln cosh processor 53d from the computation result of the ln cosh processor 53c.

An adder 54a of the symbol judgment portion 54 adds the output signal of the integration part 51b of the correlation unit 51 and the output signal of the nonlinear unit 53 to produce the computation result (soft judgment target value) lnP$_2$ of Equation (27). A judgment portion 54b judges the positive or negative value of the computation result lnP$_2$, judging that the received symbol of the second subchannel is "0" if the value is positive and that the received symbol is "1" if the value is negative. Further, the symbol judgment portion 54 feeds back the computation result (soft judgment target value) lnP$_2$ of Equation (27) to the other-channel judgment result creation portion 42 of the receiver device 40 of the first subchannel.

In summary of the above, the receiver devices 40 and 50 (1) output first and second correlation values by integrating the result of multiplying first and second reference signals that are created by considering the degrees of coupling a$_1$ and a$_2$ between the reception signal and the crosstalk path; (2) add together the second correlation value and the soft judgment target value inputted by the other receiver device; (3) calculate the adjustment value for adjusting their own soft judgment target value on the basis of the addition result; (4) adjust their own soft judgment target value by adding the adjustment value to the first correlation value; and (5) judge "0" and "1" of the reception data on the basis of the soft judgment target value.

Figure 12:
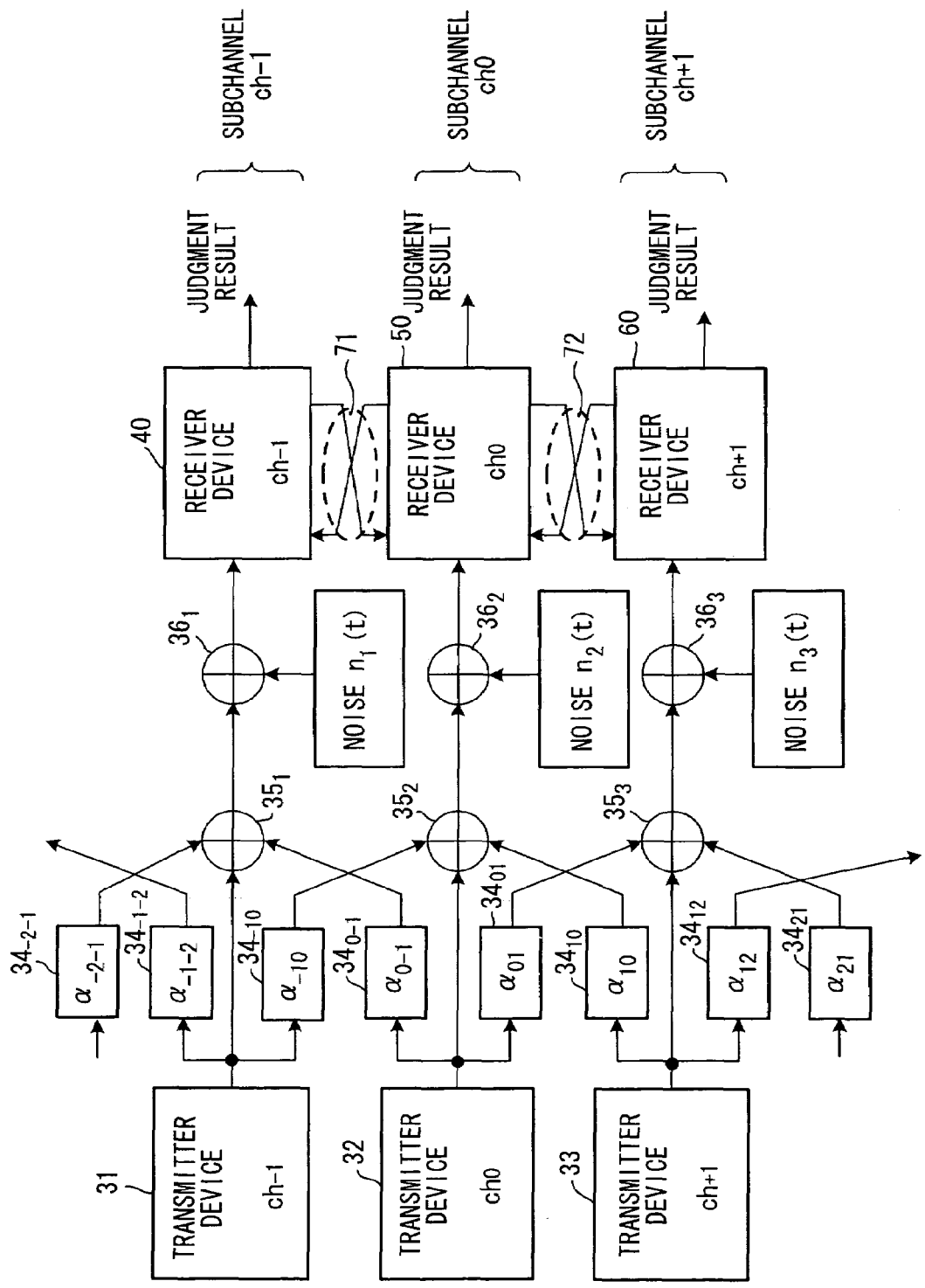
FIG. 12 is an overall constitutional view of a communication system that demodulates reception data by using interference between lower and upper adjacent subchannels.

(B) When There Are Two Subchannels Delivering Crosstalk (a) Overall Constitution of Communication System FIG. 12 is an overall constitutional view of a communication system that demodulates reception data by using interference between lower and upper adjacent subchannels, wherein the communication system comprises three transmitter devices 31, 32, and 33 for transmitting data independently via three subchannels ch−1, ch0 and ch+1; a multiplicity of crosstalk paths 34$_{ij}$ with the coupling coefficient a$_{ij}$ from the ith subchannel to the jth subchannel; three receiver devices 40, 50, and 60 that are provided in each subchannel, receive data from the corresponding subchannel and perform a soft judgment of the reception data, and means 71 and 72 for inputting a soft judgment target value for each receiver device to the other receiver device. 35$_1$ to 35$_3$ and 36$_1$ to 36$_3$ are synthesizer portions for synthesizing an ICI signal and noise, and so forth.

The receiver device 50 of the subchannel ch0 uses the soft judgment target values thus inputted by the receiver devices 40 and 60 of the lower and upper subchannels ch−1 and ch+1 respectively to adjust its own soft judgment target value and judges "0" and "1" of the reception data on the basis of the soft judgment target value. Similarly, the other receiver device also uses the soft judgment target values inputted by the receiver devices of the lower and upper subchannels to adjust its own soft judgment target value and judges "0" and "1" of the reception data on the basis of the soft judgment target value.

(b) Algorithm for Received Symbol Demodulation

An algorithm whereby the receiver of the target subchannel ch0 in the communication system shown in FIG. 12 demodulates the received symbols will now be described.

The principle behind the demodulation algorithm is to derive the value lnD$_0$ indicating the difference between the posterior probability P(D$_0$=+1/y(t)) that the information symbol received on the target subchannel ch0 will be "0" (=+1) and the posterior probability P(D$_0$=−1/y(t)) that this information symbol will be "1" (=−1). First, the value lnD$_0$ indicating the difference in the posterior probability is derived.

Suppose that binary information (twin-value information) is transmitted as the signal S*$_{ij}$(t) via two adjacent subchannels. Further, the index i of S*$_{ij}$(t) denotes the subchannel number (i=−1, 0 or 1) and the index j is determined from the code of the information symbol Di of the subchannel i. That is, if $Di=+1, j=0$ and if $Di=-1, j=1$ (29).

Thereafter, in order to simplify the notation, the time dependency S*$_{ij}$(t) is omitted from Equation (29). That is, S*$_{ij}$(t) is written as S*$_{ij}$.

Suppose that the transmission information symbols D$_i$ are statistically independent (without correlation) and are equally distributed probability variables. Based on FIG. 12, the signal of the target subchannel under the influence of ICI from the lower and upper subchannels is expressed as the linear coupling of the crosstalk coefficients a of the signals $S^*_{-1j}$ and $S^*_{1j}$ that are transmitted on the upper and lower subchannels and the target channel signal $S^*_{0j}$. Further, the crosstalk coefficient a is a value corresponding to the crosstalk leakage. If the information symbol $D_0$ of the target channel is +1, the reception signal $S_j$ (j=0 to 3) of the target channel depends on whether the signals $D_{-1}$ and $D_1$ of the lower and upper subchannels respectively are +1 or −1

$$\begin{cases} S_0 = S^*_{00} + \alpha_{-10} \cdot S^*_{-10} + \alpha_{10} \cdot S^*_{10}, D_0 = +1, D_{-1} = +1, D_1 = +1 \\ S_1 = S^*_{00} + \alpha_{-10} \cdot S^*_{-10} - \alpha_{10} \cdot S^*_{10}, D_0 = +1, D_{-1} = +1, D_1 = -1 \\ S_2 = S^*_{00} - \alpha_{-10} \cdot S^*_{-10} + \alpha_{10} \cdot S^*_{10}, D_0 = +1, D_{-1} = -1, D_1 = +1 \\ S_3 = S^*_{00} - \alpha_{-10} \cdot S^*_{-10} - \alpha_{10} \cdot S^*_{10}, D_0 = +1, D_{-1} = -1, D_1 = -1 \end{cases} \quad (30)$$

j of signal $S_j$ denotes the signal number. Further, similarly, if the information symbol $D_0$ of the target channel is −1, the reception signal $S_j$ (j=4 to 7) of the target channel depends on whether the signals $D_{-1}$ and $D_1$ of the lower and upper subchannels respectively are +1 or −1

$$\begin{cases} S_4 = -S^*_{00} + \alpha_{-10} \cdot S^*_{-10} + \alpha_{10} \cdot S^*_{10} = -S_3, \\ \quad D_0 = -1, D_{-1} = +1, D_1 = +1 \\ S_5 = -S^*_{00} + \alpha_{-10} \cdot S^*_{-10} - \alpha_{10} \cdot S^*_{10} = -S_2, \\ \quad D_0 = -1, D_{-1} = +1, D_1 = -1 \\ S_6 = -S^*_{00} - \alpha_{-10} \cdot S^*_{-10} + \alpha_{10} \cdot S^*_{10} = -S_1, \\ \quad D_0 = -1, D_{-1} = -1, D_1 = +1 \\ S_7 = -S^*_{00} - \alpha_{-10} \cdot S^*_{-10} - \alpha_{10} \cdot S^*_{10} = -S_0, \\ \quad D_0 = -1, D_{-1} = -1, D_1 = -1 \end{cases} \quad (31)$$

Following the introduction of ICI, $S_j$(i=0, 1, 2, . . . 7) is used for eight signals of the inputs of the receivers of each of the subchannels in accordance with Equations (30) and (31). The index j of $S_j$ in Equations (30) and (31) denotes the signal number and is determined by pairing the symbols $D_{-1}$, $D_1$, and $D_0$ of the lower, upper and target subchannels respectively.

An algorithm for optimum reception can also be developed by considering (1) and (2) below. That is, an optimum reception algorithm can also be developed by considering the fact that (1) certain information signals have opposite codes and are $S^*_{-10}=-S^*_{-11}$, $S^*_{00}=-S^*_{01}$ and $S^*_{10}=-S^*_{11}$ (2) the same signals are used on the lower, upper and target subchannels to transmit information symbols, namely, $S^*_{-10}=S^*_{00}=S^*_{10}=$ and $S^*_{-10}=S^*_{01}=S^*_{11}$.

The latter point (2) indicates the fact that there is no difference relative to amplitude, waveform, energy, and so forth between the information signals of all the subchannels. In such a case, the signals of the Equations (30) and (31) of the respective subchannels are a pair as shown by the following equation and have opposite codes.

$$\begin{cases} S_0 = S^*_{00} + \alpha_{-10} \cdot S^*_{-10} + \alpha_{10} \cdot S^*_{10} = -S_7 \\ S_1 = S^*_{00} + \alpha_{-10} \cdot S^*_{-10} - \alpha_{10} \cdot S^*_{10} = -S_6 \\ S_2 = S^*_{00} - \alpha_{-10} \cdot S^*_{-10} + \alpha_{10} \cdot S^*_{10} = -S_5 \\ S_3 = S^*_{00} - \alpha_{-10} \cdot S^*_{-10} - \alpha_{10} \cdot S^*_{10} = -S_4 \end{cases} \quad (32)$$

According to Equations (30), (31), and (32), the posterior probability of receiving the signal $S_j$, that is, the posterior probability $P(S_j/y(t))$ that the reception signal will be $S_j$ is given by the following equation:

$$P[S_j/y(t)] = k_0 \cdot P_{apr}(S_j) \cdot P(y(t)/S_j) \quad (33)$$
$$= k_0 \cdot P_{apr}(S_j) \cdot \exp\left\{-\frac{1}{N_0} \int_0^T [y(t) - S_j]^2 dt\right\}$$

where $k_0$ is the normalization factor j is the signal number (j=0, 1, . . . , 7);

y(t) is a synthesis signal synthesizing a signal array $S_j$ with ICI and White Gaussian noise n(t) with a spectral power intensity $N_o$ (y(t)=$S_j$+n(t));

$P_{apr}(S_j)$ is the a priori probability of the reception signal $S_j$;

$P(y(t)/S_j)$ is a conditional probability, i.e. the probability that, when the received word is y(t), the code word that is sent will be $S_j$. The a priori probability $P_{apr}(S_j)$ (j=0, 1, . . . 7) of the target channel is expressed as the crossover product of the a priori probability that the signal of the target subchannel will be $S^*_{00}$ or $S^*_{01}$ and the posterior probability of the information signal $S^*_{ij}$ of two adjacent subchannels according to Equations (30) to (32).

That is, when $D_0$=+1, $$\begin{cases} P_{apr}(S_0) = P(S^*_{-10}) \cdot P_{apr}(S^*_{00}) \cdot P(S^*_{10}) \\ P_{apr}(S_1) = P(S^*_{-10}) \cdot P_{apr}(S^*_{00}) \cdot P(S^*_{11}) \\ P_{apr}(S_2) = P(S^*_{-11}) \cdot P_{apr}(S^*_{00}) \cdot P(S^*_{10}) \\ P_{apr}(S_3) = P(S^*_{-11}) \cdot P_{apr}(S^*_{00}) \cdot P(S^*_{11}) \end{cases} \quad (34)$$

and, when $D_0$=−1, $$\begin{cases} P_{apr}(S_4) = P(S^*_{-10}) \cdot P_{apr}(S^*_{01}) \cdot P(S^*_{10}) \\ P_{apr}(S_5) = P(S^*_{-10}) \cdot P_{apr}(S^*_{01}) \cdot P(S^*_{11}) \\ P_{apr}(S_6) = P(S^*_{-11}) \cdot P_{apr}(S^*_{01}) \cdot P(S^*_{10}) \\ P_{apr}(S_7) = P(S^*_{-11}) \cdot P_{apr}(S^*_{01}) \cdot P(S^*_{11}) \end{cases} \quad (35)$$

In Equations (34) to (35), the a priori probability $P_{apr}(S_j)$ is the a priori probability (transmission probability) that the number—j information signal $S_j$ will be transmitted on the target subchannel. Further, the a priori probability $P_{apr}(S^*_{ij})$ is dependent on the statistics of the data production source and, most realistically, may be assumed to be equal to ½. The probability $P(S^*_{ij})$ is the posterior probability of the reception signal $S^*_{ij}$ and is different from the a priori probability $P_{apr}(S^*_{ij})$, and can be estimated highly reliably on the receiver side. Thus, $P(S^*_{ij})$~ $P(S^*_{ij}/y(t))$. This is surely the best estimate of $P(S^*_{ij})$ on a white noise channel. As a result of this assumption, Equations (34) and (35) can be rewritten as follows.

$$\begin{cases} P_{apr}(S_0) = P(S^*_{-10}/y(t)) \cdot P_{apr}(S^*_{00}) \cdot P(S^*_{10}/y(t)) \\ P_{apr}(S_1) = P(S^*_{-10}/y(t)) \cdot P_{apr}(S^*_{00}) \cdot P(S^*_{11}/y(t)) \\ P_{apr}(S_2) = P(S^*_{-11}/y(t)) \cdot P_{apr}(S^*_{00}) \cdot P(S^*_{10}/y(t)) \\ P_{apr}(S_3) = P(S^*_{-11}/y(t)) \cdot P_{apr}(S^*_{00}) \cdot P(S^*_{11}/y(t)) \end{cases} \quad (36)$$

-continued $$\begin{cases} P_{apr}(S_4) = P(S^*_{-10}/y(t)) \cdot P_{apr}(S^*_{01}) \cdot P(S^*_{10}/y(t)) \\ P_{apr}(S_5) = P(S^*_{-10}/y(t)) \cdot P_{apr}(S^*_{01}) \cdot P(S^*_{11}/y(t)) \\ P_{apr}(S_6) = P(S^*_{-11}/y(t)) \cdot P_{apr}(S^*_{01}) \cdot P(S^*_{10}/y(t)) \\ P_{apr}(S_7) = P(S^*_{-11}/y(t)) \cdot P_{apr}(S^*_{01}) \cdot P(S^*_{11}/y(t)) \end{cases} \quad (37)$$

Alternatively, when a direct relationship exists between the information signal $S^*_{ij}$ and transmission information signal $D_i$ (See Equation (1)), substitution with $P(S^*_{ij})=P(D_i=j/y(t))$ can be performed in Equations (34) and (35) and Equations (34) and (35) can be expressed by the following equations. Further, $P(S^*_{ij})$ is the probability that the first subchannel signal $D_i$ will be j.

$$\begin{cases} P_{apr}(S_0) = P(D_{-1}=+1/y(t)) \cdot P_{apr}(S^*_{00}) \cdot P(D_1=+1/y(t)) \\ P_{apr}(S_1) = P(D_{-1}=+1/y(t)) \cdot P_{apr}(S^*_{00}) \cdot P(D_1=-1/y(t)) \\ P_{apr}(S_2) = P(D_{-1}=-1/y(t)) \cdot P_{apr}(S^*_{00}) \cdot P(D_1=+1/y(t)) \\ P_{apr}(S_3) = P(D_{-1}=-1/y(t)) \cdot P_{apr}(S^*_{00}) \cdot P(D_1=-1/y(t)) \end{cases} \quad (38)$$

$$\begin{cases} P_{apr}(S_4) = P(D_{-1}=+1/y(t)) \cdot P_{apr}(S^*_{01}) \cdot P(D_1=+1/y(t)) \\ P_{apr}(S_5) = P(D_{-1}=+1/y(t)) \cdot P_{apr}(S^*_{01}) \cdot P(D_1=-1/y(t)) \\ P_{apr}(S_6) = P(D_{-1}=-1/y(t)) \cdot P_{apr}(S^*_{01}) \cdot P(D_1=+1/y(t)) \\ P_{apr}(S_7) = P(D_{-1}=-1/y(t)) \cdot P_{apr}(S^*_{01}) \cdot P(D_1=-1/y(t)) \end{cases} \quad (39)$$

In Equations (38) and (39), the a priori probability $P_{apr}(S_j)(j=0, 1, 2 \ldots, 7)$ of the reception signal $S_j$ on the target subchannel is expressed by the crossover channel product between the transmission a priori probability $P_{apr}(S^*_{ij})$ of the information signal $S^*_{ij}$ and the posterior probability that the information symbol $D_i$ received on lower and upper adjacent channels will be +1 or −1.

In the turbo receiver, the code of the received information symbol $D_0$ of the target subchannel is determined as follows. That is, the probability $P(D_0=+1/y(t))$ that the received information symbol $D_0$ of the target subchannel (number 0) will be +1 and the probability $P(D_0=-1/y(t))$ that the received information symbol $D_0$ will be −1 are each found and, by comparing the size of these probabilities or comparing a threshold value with the difference between the logarithms for the probabilities, the code of the received information symbol $D_0$ is determined.

The posterior probability $P(D_0=j/y(t))$ that the received information symbol $D_0$ of the target subchannel will be j can be obtained as the posterior probability of receiving a signal for which $D_0$ is j. Therefore, the posterior probability $P(D_0=+1/y(t))$ that the received information symbol $D_0$ of the target subchannel is "0" (=+1) can be found as follows. That is, because, according to Equations (29) and (30), the signals that transmit the information symbol "0" (=+1) on the target subchannel are $S_0$ to $S_3$, the posterior probability $P(D_0=+1/y(t))$ that the received information symbol $D_0$ of the target subchannel will be "0" (=+1) is the sum of the posterior probabilities of receiving the signals $S_0$ to $S_3$ and can be found by means of Equation (40a). Likewise, the posterior probability $P(D_0=-1/y(t))$ that the received information symbol $D_0$ of the target subchannel will be "0" (=−1) can be found by means of Equation (40b).

$$\begin{cases} P(D_0=+1/y(t)) = \\ k \cdot [P(S_0/y(t)) + \cdot P(S_1/y(t)) + P(S_2/y(t)) + P(S_3/y(t))] \\ P(D_0=-1/y(t)) = \\ k \cdot [P(S_4/y(t)) + \cdot P(S_5/y(t)) + P(S_6/y(t)) + P(S_7/y(t))] \end{cases} \quad \begin{matrix}(40a)\\ \\(40b)\end{matrix}$$

When Equation (33) is applied to Equation (40a) (where $k_0=1$), Equation (41)

$$P(D_0=+1/y(t)) = k \cdot [P_{apr}(S_0) \cdot P(y(t)/S_0) + P_{apr}(S_1) \cdot P(y(t)/S_1)] + \quad (41)$$
$$k \cdot [P_{apr}(S_2) \cdot P(y(t)/S_2) + P_{apr}(S_3) \cdot P(y(t)/S_3)]$$

is produced and, when equation (33) is applied to Equation (40b) (where $k_0=1$), Equation (42)

$$P(D_0=-1/y(t)) = k \cdot [P_{apr}(S_4) \cdot P(y(t)/S_4) + P_{apr}(S_5) \cdot P(y(t)/S_5)] + \quad (41)$$
$$k \cdot [P_{apr}(S_6) \cdot P(y(t)/S_6) + P_{apr}(S_7) \cdot P(y(t)/S_7)]$$

is produced. When Equations (38) and (39) are substituted in Equations (41) and (42) respectively and, for the sake of simplification, y(t) in $P(D_i=\pm 1/y(t))$ is omitted (that is, supposing that $P(D_i=\pm 1/y(t))=P(D_i=\pm 1)$), Equations (43) and (44) are obtained.

$$P(D_0=+1/y(t)) = \quad (43)$$
$$k \cdot \begin{bmatrix} P(D_{-1}=+1) \cdot P_{apr}(S^*_{00}) \cdot P(D_1=+1) \cdot P(y(t)/S_0) + \\ P(D_{-1}=+1) \cdot P_{apr}(S^*_{00}) \cdot P(D_1=-1) \cdot P(y(t)/S_1) + \\ P(D_{-1}=-1) \cdot P_{apr}(S^*_{00}) \cdot P(D_1=+1) \cdot P(y(t)/S_2) + \\ P(D_{-1}=-1) \cdot P_{apr}(S^*_{00}) \cdot P(D_1=-1) \cdot P(y(t)/S_3) \end{bmatrix}$$

$$P(D_0=-1/y(t)) = \quad (44)$$
$$k \cdot \begin{bmatrix} P(D_{-1}=+1) \cdot P_{apr}(S^*_{01}) \cdot P(D_1=+1) \cdot P(y(t)/S_4) + \\ P(D_{-1}=+1) \cdot P_{apr}(S^*_{01}) \cdot P(D_1=-1) \cdot P(y(t)/S_5) + \\ P(D_{-1}=-1) \cdot P_{apr}(S^*_{01}) \cdot P(D_1=+1) \cdot P(y(t)/S_6) + \\ P(D_{-1}=-1) \cdot P_{apr}(S^*_{01}) \cdot P(D_1=-1) \cdot P(y(t)/S_7) \end{bmatrix}$$

In addition, Equations (45a) and (45b) are obtained when Equation (43) is modified.

$$P(D_0=+1/y(t))=k \cdot P_{apr}(S_{00}^*) \cdot [P(D_{-1}=+1) \cdot P(D_1=+1) \cdot P(y(t)/S_0)+P(D_{-1}=+1) \cdot P(D_1=-1) \cdot P(y(t)/S_1)]+k \cdot P_{apr}(S_{00}^*) \cdot [P(D_{-1}=-1) \cdot P(D_1=+1) \cdot P(y(t)/S_2)+P(D_{-1}=-1) \cdot P(D_1=-1) \cdot P(y(t)/S_3)] \quad (45a)$$

$$P(D_0=+1/y(t))=k \cdot P_{apr}(S_{00}^*) \cdot [P(D_{-1}=+1) \cdot \{P(D_1=+1) \cdot P(y(t)/S_0)+P(D_1=-1) \cdot P(y(t)/S_1)\}]+k \cdot P_{apr}(S_{00}^*) \cdot [P(D_{-1}=-1) \cdot \{P(D_1=+1) \cdot P(y(t)/S_2)+P(D_1=-1) \cdot P(y(t)/S_3)\}] \quad (45b)$$

Similarly, Equations (46a) and (46b) are obtained when Equation (44) is modified.

$$P(D_0=-1/y(t))=k \cdot P_{apr}(S_{01}^*) \cdot [P(D_{-1}=+1) \cdot P(D_1=+1) \cdot P(y(t)/S_4)+P(D_{-1}=+1) \cdot P(D_1=-1) \cdot P(y(t)/S_5)]+k \cdot P_{apr}(S_{00}^*) \cdot [P(D_{-1}=-1) \cdot P(D_1=+1) \cdot P(y(t)/S_6)+P(D_{-1}=-1) \cdot P(y(t)/S_7)] \quad (46a)$$

$$P(D_0=-1/y(t))=k \cdot P_{apr}(S_{01}^*) \cdot [P(D_{-1}=+1) \cdot \{P(D_1=+1) \cdot P(y(t)/S_4)+P(D_1=-1) \cdot P(y(t)/S_5)\}]+k \cdot P_{apr}(S_{01}^*) \cdot [P(D_{-1}=-1) \cdot \{P(D_1=+1) \cdot P(y(t)/S_6)+P(D_1=-1) \cdot P(y(t)/S_7)\}] \quad (46b)$$

When the posterior probabilities $P(D_0=+1/y(t))$ and $P(D_0=-1/y(t))$ that the reception information symbol $D_0$ of the target subchannel is "0" (=+1) and "1" (=−1) respectively are found by means of the above, the code (+1 or −1) of the received information symbol can be determined by comparing the size of these probabilities or comparing a threshold value with the difference between the logarithms for the probabilities.

Judgment from Size Comparison

The determination of whether the information symbol $D_0$ of the target subchannel is +1 or −1 is made by first calculating $$\frac{P(D_0 = +1/y(t))}{P(D_0 = -1/y(t))}$$

and then performing a judgment by means of Equations (47a) and (47b). That is, if $$\frac{P(D_0 = +1/y(t))}{P(D_0 = -1/y(t))} > 1, \tag{47a}$$

it is judged that $D_0=+1$ and, if $$\frac{P(D_0 = +1/y(t))}{P(D_0 = -1/y(t))} < 1, \tag{47b}$$

it is judged that $D_0=-1$.

Judgment of Logarithm Difference

The determination of whether the information symbol $D_0$ of the target subchannel is +1 or −1 is made by first calculating $\ln P(D_0=+1/y(t)) - \ln P(D_0=-1/y(t))$ (where ln is an e-based logarithm) and then performing a judgment based on whether the calculated values are positive or negative. That is, if $$ln\ P(D_0=+1/y(t))-ln\ P(D_0=-1/y(t))>0 \tag{47c},$$

it is judged that $$D_0=+1 \text{ and, if } ln\ P(D_0=+1/y(t))-ln\ P(D_0=-1/y(t))<0 \tag{47d},$$

it is judged that $D_0=-1$.

Further, the following equation is established from the fact that the transmission symbols $D_0$ are statistically independent (without correlation) and are equally distributed probability variables.

$$\begin{cases} P_{apr}(S^*_{-10}) = P_{apr}(S^*_{00}) = P_{apr}(S^*_{+10}) = 1/2 \\ P_{apr}(S^*_{-11}) = P_{apr}(S^*_{01}) = P_{apr}(S^*_{+11}) = 1/2 \end{cases} \tag{48}$$

Based on Equation (48), Equations (45b) and (46b) become Equations (49) and (50) respectively because the common multiplier of Equations (45b) and (46b) does not affect the judgment rule.

$$P(D_0=+1/y(t))=P(D_{-1}=+1)\cdot\{P(D_1=+1)\cdot P(y(t)/S_0)+P(D_1=-1)\cdot P(y(t)/S_1)\}+P(D_{-1}=-1)\cdot\{P(D_1=+1)\cdot P(y(t)/S_2)+P(D_1=-1)\cdot P(y(t)/S_3)\} \tag{49}$$

$$P(D_0=-1/y(t))=P(D_{-1}=+1)\cdot\{P(D_1=+1)\cdot P(y(t)/S_4)+P(D_1=-1)\cdot P(y(t)/S_5)\}+P(D_{-1}=-1)\cdot\{P(D_1=+1)\cdot P(y(t)/S_6)+P(D_1=-1)\cdot P(y(t)/S_7)\} \tag{50}$$

Here, the following Equations (51) and (52) are produced when Equations (49) and (50) are modified by considering the algebraic uniformity of the following equation:

$$\ln(e^X + e^Y) = \frac{X+Y}{2} + \ln 2 + \ln\cosh\left(\frac{X-Y}{2}\right) \tag{a}$$

$$\begin{aligned}\ln P(D_0 = +1/y(t)) = {} & 1/2 \cdot \ln P(D_{-1} = +1) + \\ & 1/2 \cdot \ln\cdot\{P(D_1 = +1) \cdot P(y(t)/S_0) + P(D_1 = -1) \cdot P(y(t)/S_1)\} + \\ & 1/2 \cdot \ln P(D_{-1} = -1) + \\ & 1/2 \cdot \ln\{P(D_1 = +1) \cdot P(y(t)/S_2) + P(D_1 = -1) \cdot P(y(t)/S_3)\} + \\ & \ln 2 + \ln\cosh\begin{cases} 1/2 \cdot \ln P(D_{-1} = +1) + \\ 1/2 \cdot \ln\{P(D_1 = +1) \cdot P(y(t)/S_0) + P(D_1 = -1) \cdot P(y(t)/S_1)\} - \\ 1/2 \cdot \ln P(D_{-1} = -1) + \\ 1/2 \cdot \ln\{P(D_1 = +1) \cdot P(y(t)/S_2) + P(D_1 = +1) \cdot P(y(t)/S_3)\} \end{cases}\end{aligned} \tag{51}$$

$$\begin{aligned}\ln P(D_0 = -1/y(t)) = {} & 1/2 \cdot \ln P(D_{-1} = +1) + \\ & 1/2 \cdot \ln\cdot\{P(D_1 = +1) \cdot P(y(t)/S_4) + P(D_1 = -1) \cdot P(y(t)/S_5)\} + \\ & 1/2 \cdot \ln P(D_{-1} = -1) + \\ & 1/2 \cdot \ln\{P(D_1 = +1) \cdot P(y(t)/S_6) + P(D_1 = -1) \cdot P(y(t)/S_7)\} + \\ & \ln 2 + \ln\cosh\begin{cases} 1/2 \cdot \ln P(D_{-1} = +1) + \\ 1/2 \cdot \ln\{P(D_1 = +1) \cdot P(y(t)/S_4) + P(D_1 = -1) \cdot P(y(t)/S_5)\} - \\ 1/2 \cdot \ln P(D_{-1} = -1) + \\ 1/2 \cdot \ln\{P(D_1 = +1) \cdot P(y(t)/S_6) + P(D_1 = +1) \cdot P(y(t)/S_7)\} \end{cases}\end{aligned} \tag{52}$$

Here, when the following equations (53) and (54) are adopted, $$\ln P(D_0 = +1/y(t)) = \frac{A+B}{2} + \ln 2 + \ln\cosh\left(\frac{A-B}{2}\right) \tag{53}$$

$$\ln P(D_0 = -1/y(t)) = \frac{C+D}{2} + \ln 2 + \ln\cosh\left(\frac{C-D}{2}\right) \tag{54}$$

A, B, C, and D are as follows:

$$A=ln\ P(D_{-1}=+1)+ln\{P(D_1=+1)\cdot P(y(t)/S_0)+P(D_1=-1)\cdot P(y(t)/S_1)\}$$

$$B=ln\ P(D_{-1}=-1)+ln\{P(D_1=+1)\cdot P(y(t)/S_2)+P(D_1=-1)\cdot P(y(t)/S_3)\}$$

$$C=ln\ P(D_{-1}=+1)+ln\{P(D_1=+1)\cdot P(y(t)/S_4)+P(D_1=-1)\cdot P(y(t)/S_5)\}$$

$$D=ln\ P(D_{-1}=-1)+ln\{P(D_1=+1)\cdot P(y(t)/S_6)+P(D_1=-1)\cdot P(y(t)/S_7)\}$$

When Equations (53) and (54) are applied to the judgment equation on the left-hand side of Equations (47a) and (47b), the new judgment equation becomes the following equation:

$$\ln D_0 = \frac{A+B}{2} - \frac{C+D}{2} + \ln\cosh\left(\frac{A-B}{2}\right) - \ln\cosh\left(\frac{C-D}{2}\right) > / < 0 \tag{55}$$

Each term constituting the new judgment equation of Equation (55) can be rewritten as follows by considering the relation $$P(y(t)/S_j) = \exp\left\{-\frac{1}{N_0}\int_0^T [y(t) - S_j]^2 dt\right\}$$

obtained from Equation (33), and Equation (32). Further, $\ln D_i = \ln P(D_i=+1) - \ln P(D_i=-1)$.

$$(A+B) - (C+D) = \tag{56}$$

$$\frac{2}{N_0}\left[\int_0^T y(t)\cdot S_0(t)dt + \int_0^T y(t)\cdot S_1(t)dt + \int_0^T y(t)\cdot S_2(t)dt + \int_0^T y(t)\cdot S_3(t)dt\right] + \ln\cosh\left\{1/2\cdot\left\{\ln D_1 + \frac{2}{N_0}\left[\int_0^T y(t)\cdot S_0(t)dt - \int_0^T y(t)\cdot S_1(t)dt\right] - \frac{E_0 - E_1}{N_0}\right\}\right\} -$$

$$\ln\cosh\left\{1/2\cdot\left\{\ln D_1 + \frac{2}{N_0}\left[\int_0^T y(t)\cdot S_0(t)dt - \int_0^T y(t)\cdot S_1(t)dt\right] + \frac{E_0 - E_1}{N_0}\right\}\right\} +$$

$$\ln\cosh\left\{1/2\cdot\left\{\ln D_1 + \frac{2}{N_0}\left[\int_0^T y(t)\cdot S_2(t)dt - \int_0^T y(t)\cdot S_3(t)dt\right] - \frac{E_2 - E_3}{N_0}\right\}\right\} - \ln\cosh\left\{1/2\cdot\left\{\ln D_1 + \frac{2}{N_0}\left[\int_0^T y(t)\cdot S_2(t)dt - \int_0^T y(t)\cdot S_3(t)dt\right] + \frac{E_2 - E_3}{N_0}\right\}\right\}$$

$\ln D_i = \ln P(D_i=+1/y(t)) - \ln P(D_i=-1/y(t))$ above is the difference in the logarithm (soft judgment value of the ith subchannel) for the posterior probability that the signal $D_i$ transmitted on the ith subchannel will be +1 or −1. Further, suppose that the energy of the signal $S_i(t)$ is $E_j$ and $E_j =$ $$E_j = \int_0^T S_j^2(t)dt.$$

Further, (A-B) and (C-D) in Equation (55) are found by the following equations.

$$(A - B) = \ln D_{-1} + \tag{57}$$

$$1/2\cdot\left\{\frac{2}{N_0}\left[\int_0^T y(t)\cdot S_0(t)dt + \int_0^T y(t)\cdot S_1(t)dt - \int_0^T y(t)\cdot S_2(t)dt - \int_0^T y(t)\cdot S_3(t)dt\right] - \frac{\Delta E_\Sigma}{N_0}\right\} +$$

$$\ln\cosh\left\{1/2\cdot\left\{\ln D_1 + \frac{2}{N_0}\left[\int_0^T y(t)\cdot S_0(t)dt - \int_0^T y(t)\cdot S_1(t)dt\right] - \frac{E_0 - E_1}{N_0}\right\}\right\} - \ln\cosh\left\{1/2\cdot\left\{\ln D_1 + \frac{2}{N_0}\left[\int_0^T y(t)\cdot S_2(t)dt - \int_0^T y(t)\cdot S_3(t)dt\right] + \frac{E_2 - E_3}{N_0}\right\}\right\}$$

$$(C - D) = \ln D_{-1} + \tag{58}$$

$$1/2\cdot\left\{\frac{2}{N_0}\left[\int_0^T y(t)\cdot S_0(t)dt + \int_0^T y(t)\cdot S_1(t)dt - \int_0^T y(t)\cdot S_2(t)dt - \int_0^T y(t)\cdot S_3(t)dt\right] + \frac{\Delta E_\Sigma}{N_0}\right\} +$$

$$\ln\cosh\left\{1/2\cdot\left\{\ln D_1 + \frac{2}{N_0}\left[\int_0^T y(t)\cdot S_0(t)dt - \int_0^T y(t)\cdot S_1(t)dt\right] + \frac{E_0 - E_1}{N_0}\right\}\right\} - \ln\cosh\left\{1/2\cdot\left\{\ln D_1 + \frac{2}{N_0}\left[\int_0^T y(t)\cdot S_2(t)dt - \int_0^T y(t)\cdot S_3(t)dt\right] + \frac{E_2 - E_3}{N_0}\right\}\right\}$$

where $$\Delta E_\Sigma = \frac{(E_0 + E_1) - (E_2 + E_3)}{N_0}. \tag{59}$$

Equations (55) to (58) define the optimum receiver structure of a binary signal with ICI. As is known from Equations (55) to (58), judgment information on an adjacent channel is employed when the code of a transmission information symbol D of a certain subchannel is judged. In the judgment rules of Equations (55) to (58), $\ln D_{-1}$ and $\ln D_{+1}$ express the difference in the logarithms for the posterior probability that the information symbol of the lower subchannel (ch−1) and the upper subchannel (ch+1) will be +1 and the posterior probability that the information symbol of the lower subchannel (ch−1) and the upper subchannel (ch+1) will be −1. Because all the calculations are serial calculations, the latest posterior probability from an adjacent subchannel can be used by means of repeated calculation during the data processing of the target subchannel.

Based on the above, $\ln D_0$, which is a soft judgment target value, is calculated by means of Equations (55) to (58) and then an algorithm is created to judge whether the received symbol of the target subchannel is "0" or "1" in accordance with whether the soft judgment target value $\ln D_0$ is positive or negative.

(c) Constitution of Receiver Device

Figure 13:
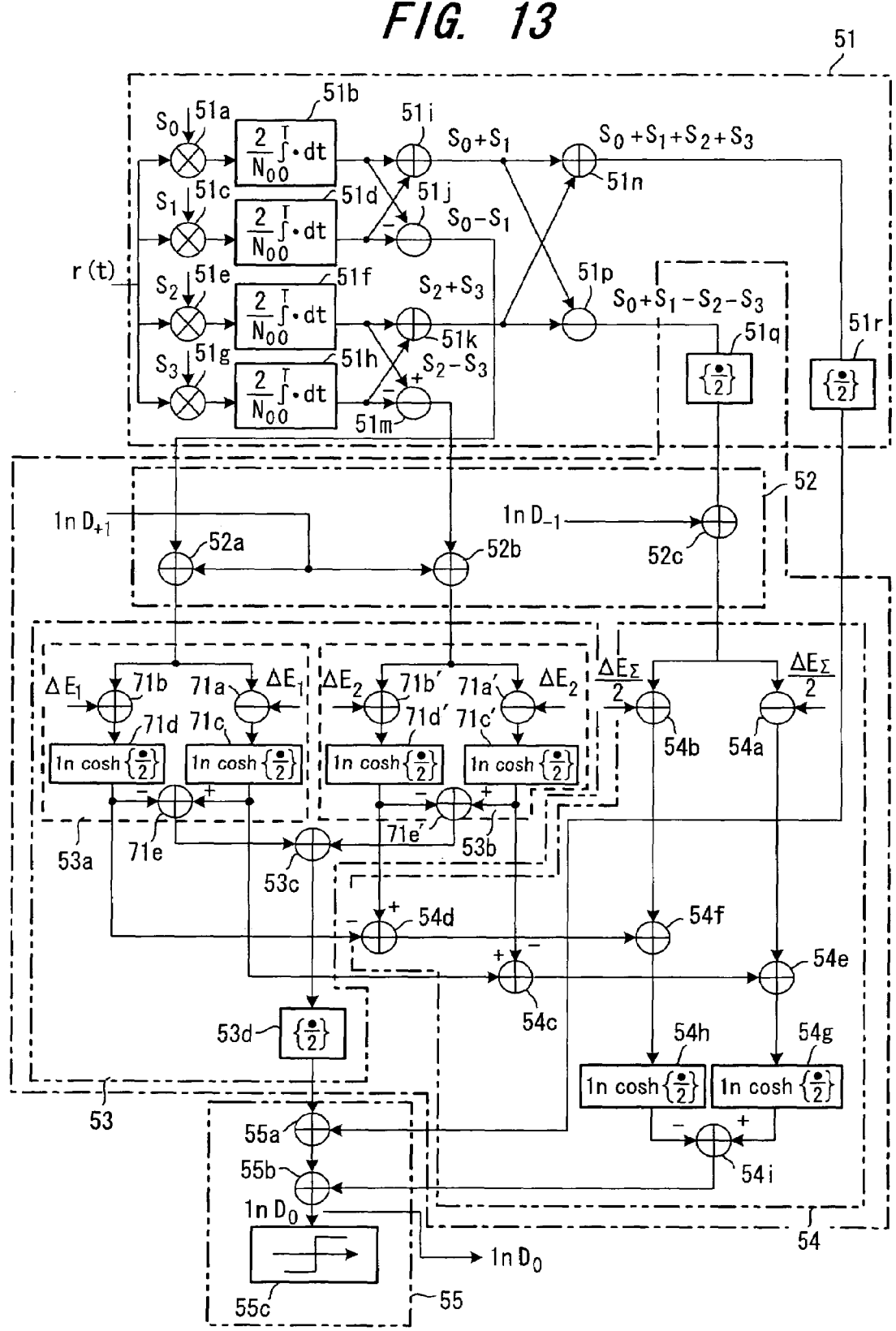
FIG. 13 is a constitutional view of a receiver device (ICI-3 turbo receiver) based on maximum posterior probability that utilizes ICI.

FIG. 13 is a constitutional view of a receiver device, that is, a receiver device (turbo receiver) based on the maximum posterior probability that utilizes ICI. Although a constitution consisting of only the receiver portion of the target subchannel is shown, the receiver portion of the other subchannel may have the same constitution. Further, the receiver portion has a constitution that executes the above algorithm.

In a broad classification, the receiver device 50 of the target subchannel comprises a correlation unit (matched filter is also acceptable) 51, an other-channel judgment result creation portion 52, first and second nonlinear unit 53 and 54 respectively, and a symbol judgment portion 55.

The multiplier 51a and integrator 51b of the correlation unit 51 are parts that compute $$\frac{2}{N_0}\int_o^T y(t)\cdot S_0(t)dt$$

of Equations (56) to (58), which are judgment equations; multiplier 51c and integrator 51d are parts that compute $$\frac{2}{N_0} \int_o^T y(t) \cdot S_1(t) dt;$$

multiplier 51e and integrator 51f are parts that compute $$\frac{2}{N_0} \int_o^T y(t) \cdot S_2(t) dt;$$

and multiplier 51g and integrator 51h are parts that compute $$\frac{2}{N_0} \int_o^T y(t) \cdot S_3(t) dt.$$

An adder 51i adds together the integral outputs of the integrators 51b and 51d; a subtractor 51j subtracts the integral output of the integrators 51b and 51d; an adder 51k adds the integral output of the integrators 51f and 51h; a subtractor 51m subtracts the integral part of the integrators 51f and 51h. Further, an adder 51n adds the outputs of the adders 51i and 51k and outputs the first term $$\frac{2}{N_0} \int_o^T y(t) \cdot S_0(t) dt + \frac{2}{N_0} \int_0^T y(t) S_1(t) dt + \frac{2}{N_0} \int_0^T y(t) S_2(t) dt + \frac{2}{N_0} \int_0^T y(t) S_3(t) dt$$

on the right-hand side of Equation (56). Further, a subtractor 51p subtracts the outputs of the adders 51i and 51k and outputs $$\frac{2}{N_0} \int_o^T y(t) \cdot S_0(t) dt + \frac{2}{N_0} \int_0^T y(t) S_1(t) dt - \left( \frac{2}{N_0} \int_0^T y(t) S_2(t) dt - \frac{2}{N_0} \int_0^T y(t) S_3(t) \right) dt.$$

Dividers 51q and 51r halve the input signal and output the result.

The other-channel judgment result creation portion 52 comprises adders 52a to 52c and computes:

$$\ln D_{+1} + \frac{2}{N_0} \int_o^T y(t) \cdot S_0(t) dt - \frac{2}{N_0} \int_o^T y(t) S_1(t) dt,$$

$$\ln D_{+1} + \frac{2}{N_0} \int_o^T y(t) \cdot S_2(t) dt - \frac{2}{N_0} \int_o^T y(t) S_3(t) dt,$$

$$\ln D_{-1} + \frac{1}{N_0} \int_o^T y(t) \cdot S_0(t) dt + \frac{1}{N_0} \int_0^T y(t) S_1(t) dt - \frac{1}{N_0} \int_0^T y(t) S_2(t) dt - \frac{1}{N_0} \int_0^T y(t) S_3(t) \Big) dt.$$

The first nonlinear unit 53 is a part that computes ln cosh of the second to fifth terms on the right-hand side of Equation (56) and comprises first and second nonlinear portions 53a and 53b respectively. Adders 71a and 71b of the first nonlinear portion 53a each compute the part in brackets{ } of the second and third terms on the right-hand side of Equation (56), where $(E_0-E_1)/N_0=\Delta E_1$. ln cosh processors 71c and 71d each compute the second and third terms on the right-hand side of Equation (56) and a subtractor 71e subtracts and outputs the computation result of the ln cosh processor 71d from the computation result of the ln cosh processor 71c'.

Further, the adders 71a' and 71b' of the second nonlinear portion 53b each compute the part in brackets { } of the fourth and fifth terms on the right-hand side of Equation (56), where $(E_2-E_3)/N_0=\Delta E_2$. ln cosh processors 71c' and 71d' each compute the fourth and fifth terms of the right-hand side of Equation (56) and a subtractor 71e' subtracts and outputs the computation result of the ln cosh processor 71d' from the computation result of the ln cosh processor 71c'.

Further, the adder 53c synthesizes the outputs of adders 71e and 71e' and the divider 53d halves the synthesized signal and outputs the results of computation of the second to fifth terms on the right-hand side of Equation (56).

The second nonlinear unit 54 is a part that computes the first to third terms on the right-hand side of Equations (57) and (58). Adders 54a and 54b each compute the first term on the right-hand side of Equations (57) and (58); adders 54c and 54d each compute the second and third terms on the right-hand side of Equations (57) and (58); adders 54e and 54f each compute the right-hand side of Equations (57) and (58); ln cosh processors 54g and 54h each compute $$\ln \cosh \frac{A-B}{2}, \ln \cosh \frac{C-D}{2};$$

a subtractor 54i computes the difference between the outputs of the ln cosh processors 54g and 54h and outputs $$\ln \cosh \frac{A-B}{2} - \ln \cosh \frac{C-D}{2}.$$

An adder 55a of the symbol judgment portion 55 adds together the output signal of a divider 51r of the correlation unit 51 and the output signal of the nonlinear unit 53 and outputs $$\frac{A-B}{2} - \frac{C-D}{2}$$

and an adder 55b produces $\ln D_0$ (soft judgment target value) of Equation (55). A judgment portion 55c judges whether $\ln D_0$ is positive or negative, judging that the received symbol is "0" if the value is positive and that the received symbol is "1" if the value is negative. Further, the symbol judgment portion 55 feeds back the computation result (soft judgment target value) $\ln D_0$ of Equation (55) to the other-channel judgment result creation portion of the receiver portions 40 and 60 of the adjacent lower and upper subchannels.

(C) Cell Constitution (a) Constitution of Receiver (ICI-2, N=1)

Figure 14:
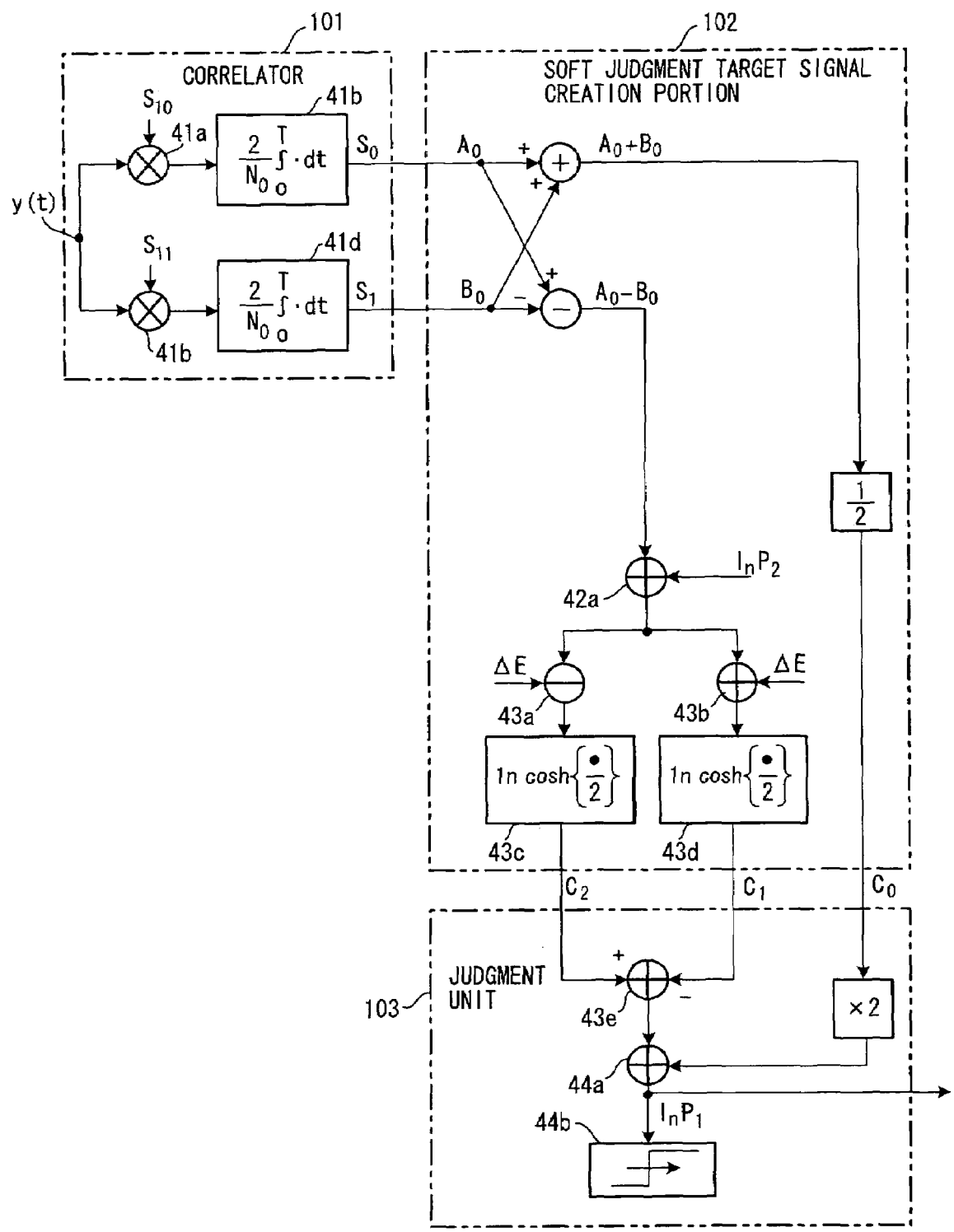
FIG. 14 is an example of a modified constitution of the receiver device (ICI-2 turbo receiver)

As shown in FIG. 11, the receiver (ICI-2, N=1) in a case where the number of crosstalk subchannels to be considered (crosstalk path number N) is 1 can be modified to a constitution that comprises a correlator 101, a soft judgment target signal creation portion 102, and a judgment unit 103, as shown in FIG. 14.

The correlator 101 computes the correlation between two reference signals $S_{10}$ and $S_{11}$ and the reception signal y(t) of the target subchannel and the soft judgment target signal creation portion 102 produces a plurality of soft judgment target signals C0 to C2 of level 0 by using two correlation signals $S_0$ and $S_1$ that are inputted by the correlator 101 and corrects the soft judgment target signal by means of the soft judgment value $lnP_2$ of another channel excluding the target subchannel. The judgment unit 103 outputs a soft judgment value $lnP$, of the target subchannel by synthesizing a plurality of soft judgment target signals C0 to C2 that are outputted by cell 102 of level 0 and judges the reception signal of the target subchannel on the basis of the soft judgment value.

Figure 15:
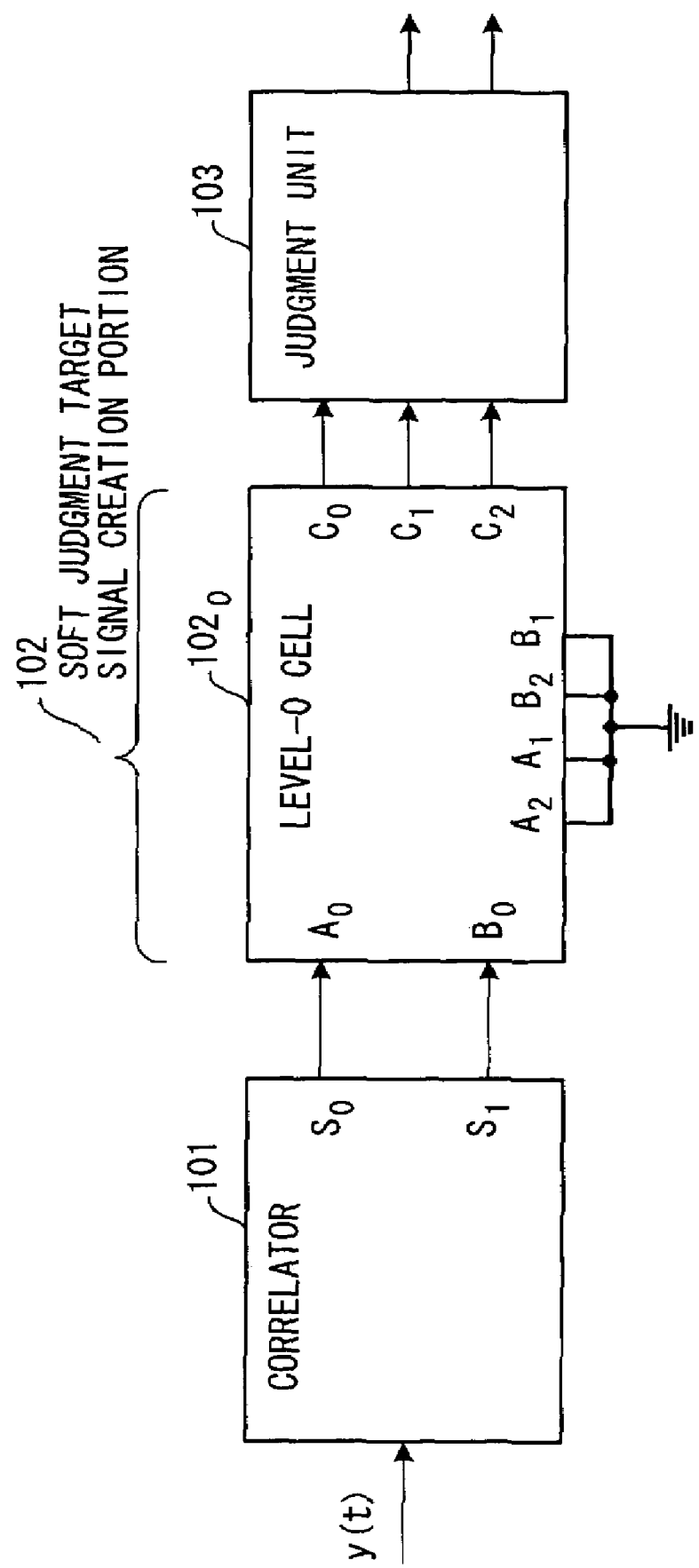
FIG. 15 shows the constitution of the connection of a receiver (ICI-2, N=1) in a case where a correlator, soft judgment target signal creation portion and judgment unit are modulized.

FIG. 15 shows the constitution of the connection of a receiver (ICI-2, N=1) in a case where the correlator 101, soft judgment target signal creation portion 102 and judgment unit 103 are modulized and the soft judgment target signal creation portion 102 is constituted by a cell $102_0$ of level 0. The number of cells is $2^N-1=1$. Signals $S_0$ and $S_1$ are correlator output signals that are defined by:

$$S_0 = (1 + a_{10})$$

$$S_1 = (1 - a_{10}).$$

The cell constitution is described below.

(b) Constitution of Receiver (ICI-3, N=2)

Figure 16:
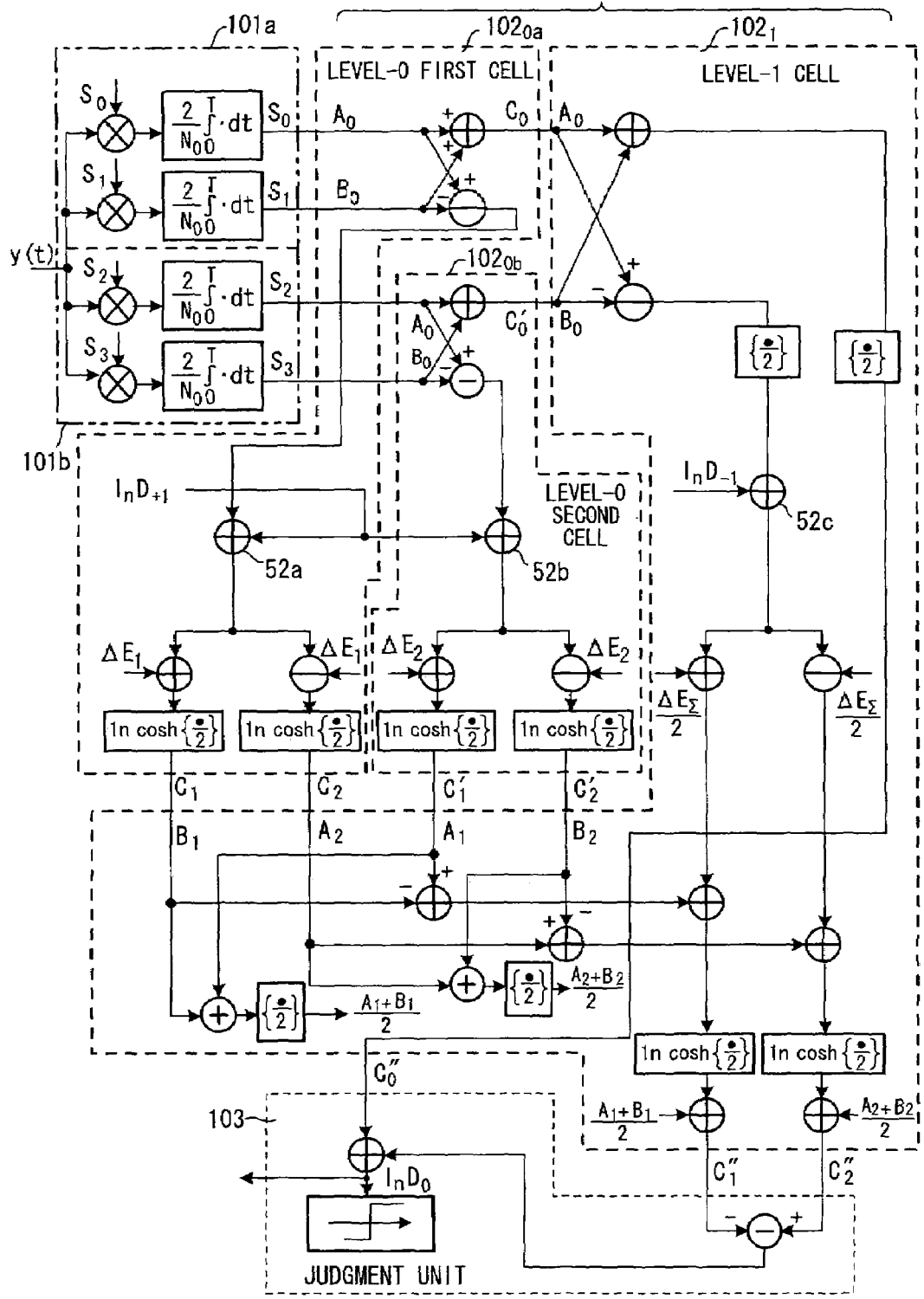
FIG. 16 is an example of a modified constitution of the receiver device (ICI-3 turbo receiver)

The receiver (ICI-3, N=2) in a case where the number of crosstalk subchannels shown in FIG. 13 (crosstalk path number N) is 2 can be modified to a constitution that comprises correlators 101a and 101b, the soft judgment target signal creation portion 102, and the judgment unit 103, as shown in FIG. 16. The soft judgment target signal creation portion 102 is constituted by cells $102_{0a}$ and $102_{0b}$ of level 0 and a cell $102_1$ of level 1.

That is, the correlators 101a and 101b each compute the correlation between two reference signals $S_0$, $S_1$; $S_2$, $S_3$ and the reception signal y(t) of the subchannel, the first cell $102_{0a}$ of level 0 produces a plurality of soft judgment target signals C0 to C2 of level 0 by using two correlation signals $S_0$ and $S_1$ that are inputted by the correlator 101a and corrects the soft judgment target signals C1 to C2 by means of the soft judgment value $lnD_{+1}$ of another subchannel excluding the target subchannel (see addition of adder 42a).

The second cell $102_{0b}$ of level 0 produces a plurality of soft judgment target signals C0' to C2' of level 0 by using two correlation signals $S_2$ and $S_3$ that are inputted by the correlator 101b and corrects the soft judgment target signals C1' to C2' by means of the soft judgment value $lnD_{+1}$ of another subchannel excluding the target subchannel (see addition of adders 52a to 52b).

Cell $102_1$ of level 1 produces a plurality of soft judgment target signals C0" to C2" of level 1 by inputting a plurality of soft judgment target signals C0 to C2 and C0' to C2' respectively from two sets of cells $102_{0a}$ and $102_{0b}$ of level 0 and corrects the soft judgment target signals C1" to C2" by means of the soft judgment value $lnD_{-1}$ of another subchannel excluding the target subchannel (see addition of adder 52c).

The judgment unit 103 outputs a soft judgment value $lnD_0$ of the target subchannel by synthesizing a plurality of soft judgment target signals C0" to C2" that are outputted by cell $102_1$ of level 1 and judges the reception signal of the target subchannel on the basis of the soft judgment value.

Figure 17:
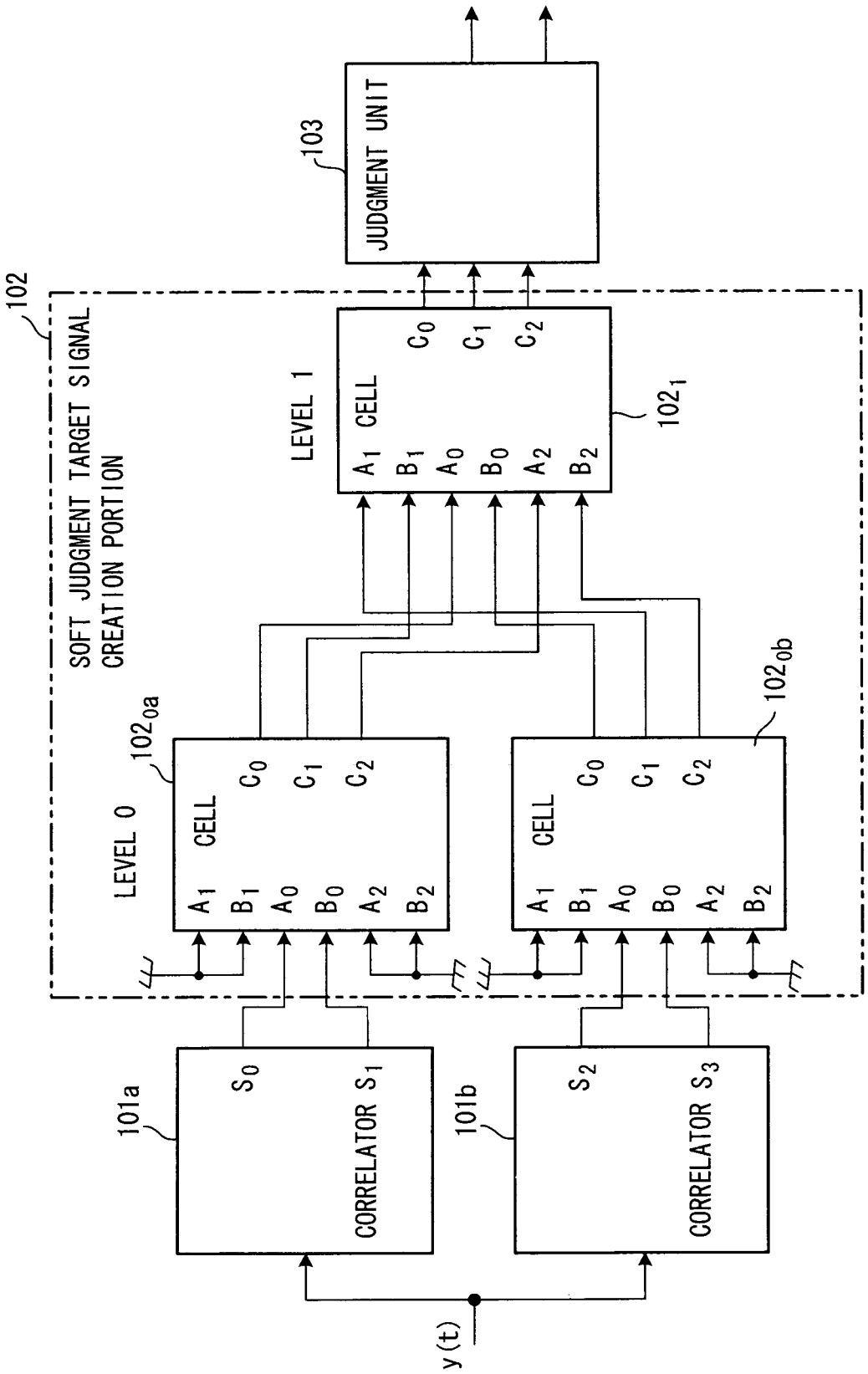
FIG. 17 shows the constitution of the connection of a receiver (ICI-3, N=2) in a case where a correlator, soft judgment target signal creation portion and judgment unit are modulized.

FIG. 17 shows the constitution of the connection of a receiver in a case where the correlator 101, cells $102_{0a}$, $102_{0b}$, and $102_1$ and judgment unit 103 are modulized, and the number of cells is $2^N-1=3$. Cell $102_1$ of level 1 receives soft judgment target signals C0 to C2 of the first cell $102_{0a}$ of level 0 as input signals $A_0$, $B_1$ and $A_2$, receives soft judgment target signals C0 to C2 of the second cell $102_{0b}$ of level 0 as input signals $B_0$, $A_1$ and $B_2$ and inputs the soft judgment target signals C0 to C2 of level 1 to the judgment unit 103. The input signals $S_0$ to $S_3$ to cells $102_{0a}$ and $102_{0b}$ of level 0 are the output signals of the correlators 101a and 101b that are defined by the following equations:

$$S_0 = (1 + a_{-10} + a_{+10})$$

$$S_1 = (1 + a_{-10} - a_{+10})$$

$$S_2 = (1 - a_{-10} + a_{+10})$$

$$S_1 = (1 - a_{-10} - a_{+10}).$$

(c) Cell Constitution of Level 1

Figure 18:
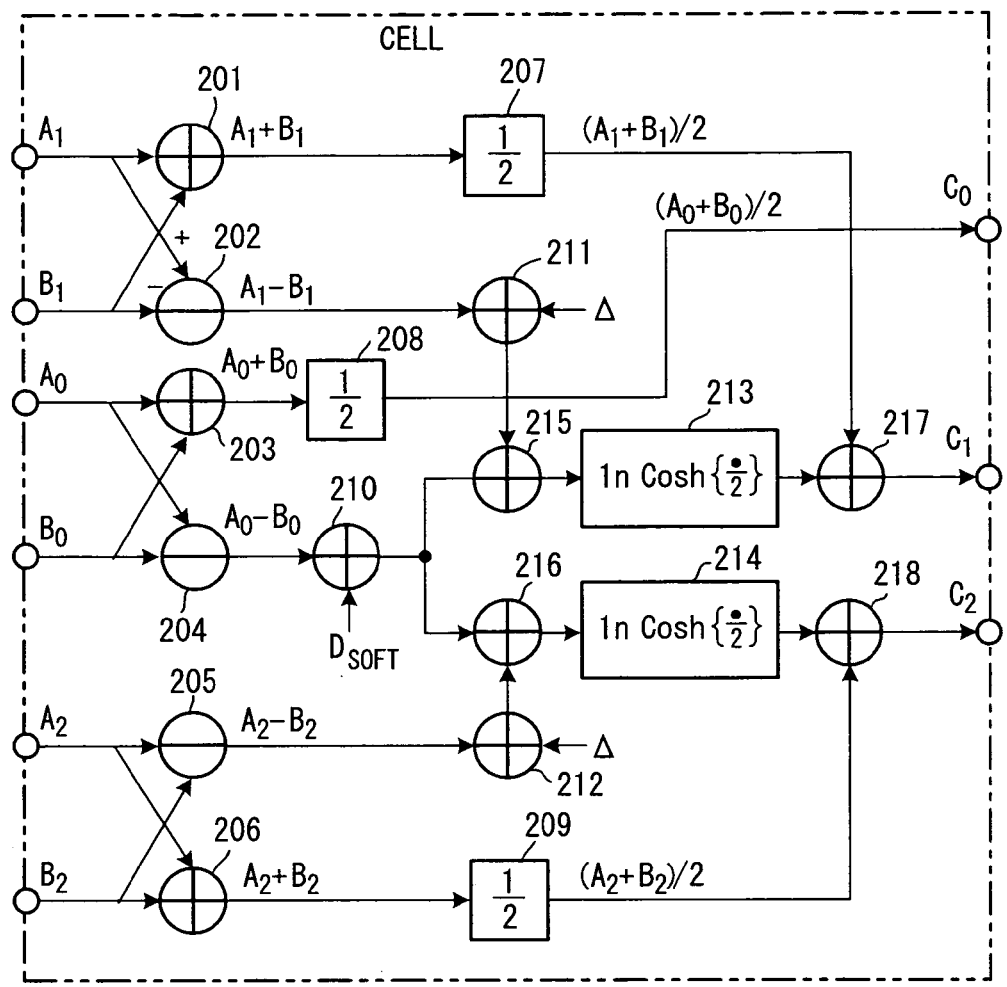
FIG. 18 is a constitutional circuit diagram of a cell.

Arranging and writing out cell $102_1$ of level 1 in FIG. 16 produces the configuration shown in FIG. 18. That is, cell $102_1$ of level 1 is constituted by processors 201 to 202 that add and subtract the input signals $A_1$ and $B_1$, processors 203 to 204 that add and subtract the input signals $A_0$ and $B_0$, processors 205 to 206 that add and subtract the input signals $A_2$ and $B_2$, ½ multipliers 207 to 209, an adder 210 that adds the soft judgment value $D_{SOFT}$ of another subchannel to the signal $(A_0-B_0)$, adders 211 to 212 that add the energy difference Δ to signals $(A_1-B_1)$ and $(A_2-B_2)$ respectively, processors 213 to 214 that compute $lncosh\{\cdot/2\}$, adders 215 to 216 that compute input signals to processors 213 to 214, and adders 217 to 218 that produce the output signals C1 to C2.

The point to be considered here is that, when the input signals $A_1$, $B_1$, $A_2$ and $B_2$ of cell $102_1$ of level 1 are 0, the result is cells $102_{0a}$ and $102_{0b}$ of level 0. In other words, a cell with the constitution shown in FIG. 18 can be formed by cells of level 0 and level 1 and, as will become evident from the subsequent description, cells of an optional level N can be formed.

(d) Judgment Unit

Figure 19:
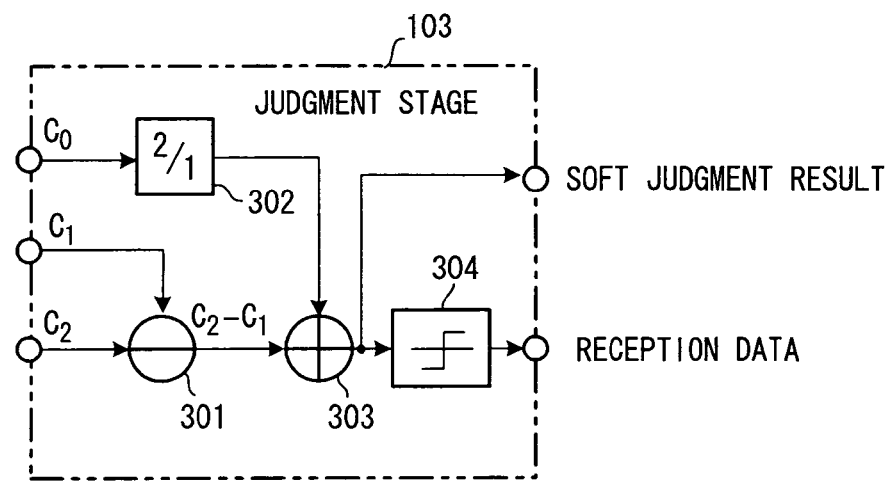
FIG. 19 is a constitutional view of the circuit of a judgment unit.

FIG. 19 is a constitutional view of the judgment unit 103 and comprises a processor 301 that computes C2-C1, a multiplier 302 that multiplies the input signal C0 by 2 only in the constitution of FIG. 15 and multiplies the input signal by 1 in other cases; an adder 303 that outputs a soft judgment value of a target channel by synthesizing the outputs of the processor 301 and multiplier 302; and a judgment portion 304 that judges "1" and "0" of the reception signal of the target channel on the basis of the soft judgment signal.

Figure 20:
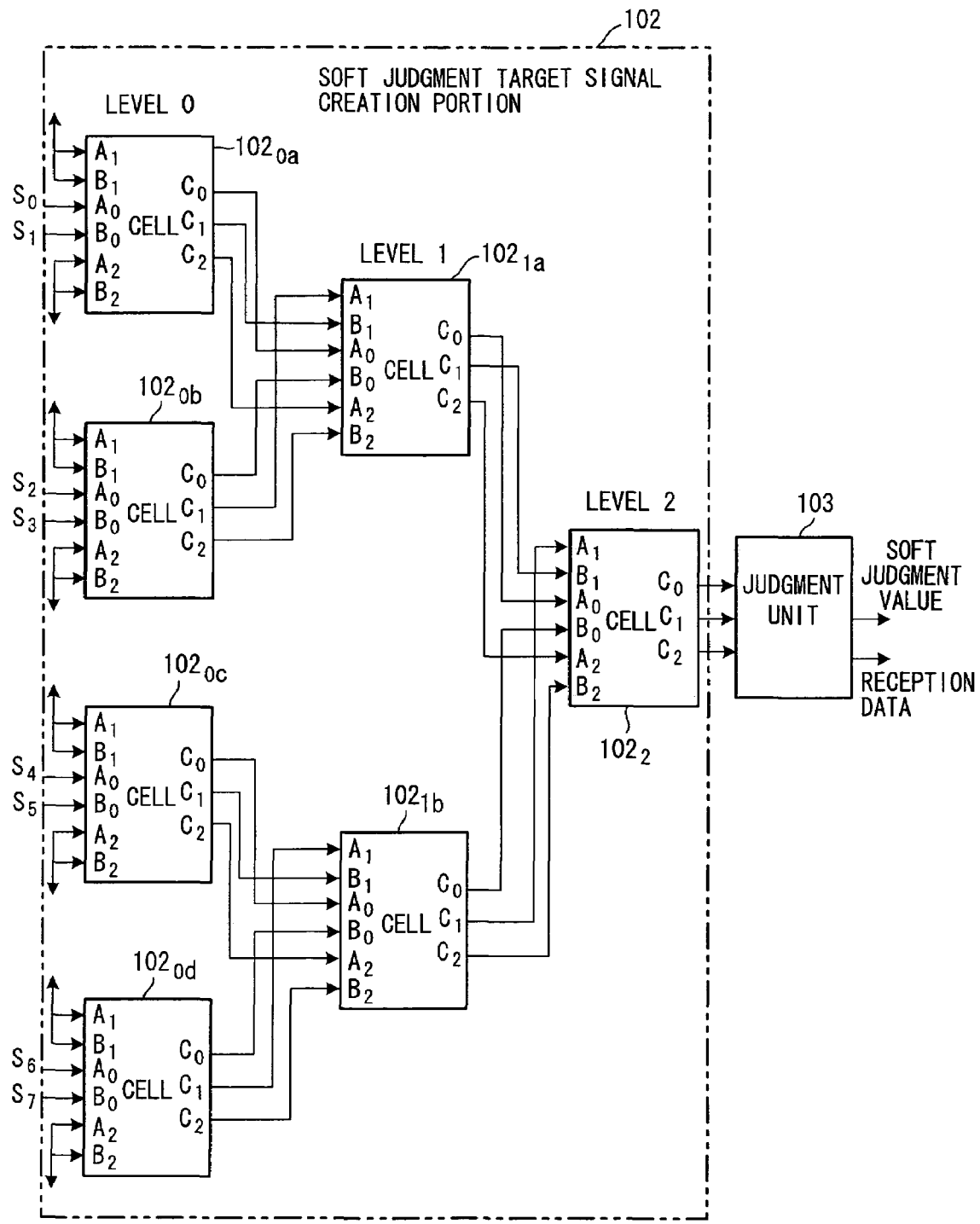
FIG. 20 is a constitutional view of the soft judgment target signal creation portion of an ICI-4, N=3 turbo receiver.

(D) Hierarchical Constitution of Cell (a) Soft Judgment Target Signal Creation Portion of ICI-4, N=3 Turbo Receiver When the fact that an ICI-2, N=1 turbo receiver and an ICI-3, N=2 turbo receiver can be implemented as shown in FIGS. 15 and 17 respectively, the soft judgment target signal creation portion of an ICI-4 turbo receiver in which the crosstalk path number N=3 can be constituted as shown in FIG. 20. The soft judgment target signal creation portion 102 comprises $2^N-1=7$ cells and is constituted by hierarchically connecting four level-0 cells $102_{0a}$ to $102_{0d}$, two level-1 cells $102_{1a}$ to $102_{1b}$, and one level-2 cell $102_2$. That is, the level-2 cell $102_2$ receives the soft judgment target signals $C_0$ to $C_2$ of the first cell $102_{1a}$ of level 1 as the input signals $A_0$, $B_1$ and $A_2$, receives the soft judgment target signals $C_0$ to $C_2$ of the second cell $102_{1b}$ of level 1 as the input signals $B_0$, $A_1$ and $B_2$, and inputs the soft judgment target signals $C_0$ to $C_2$ of level 2 to the judgment unit 103. Further, the cell $102_2$ of level 2 corrects the soft judgment target signals $C_0$ to $C_2$ of level 2 by means of the soft judgment value of another subchannel excluding the target subchannel and inputs the corrected signals to the judgment unit 103.

The input signals $S_0$ to $S_7$ of the cells $102_{0a}$ to $102_{0d}$ of level 0 are correlator output signals that are defined by the following equations:

$$S_0 = (1 + a_{-10} + a_{+10} + a_{+20}) \quad S_4 = (1 - a_{-10} + a_{+10} + a_{+20})$$
$$S_1 = (1 + a_{-10} + a_{+10} - a_{+20}) \quad S_5 = (1 - a_{-10} + a_{+10} - a_{+20})$$
$$S_2 = (1 + a_{-10} - a_{+10} + a_{+20}) \quad S_6 = (1 - a_{-10} - a_{+10} + a_{+20})$$
$$S_3 = (1 + a_{-10} - a_{+10} - a_{+20}) \quad S_7 = (1 - a_{-10} - a_{+10} + a_{+20})$$

(b) Soft Judgment Target Signal Creation Portion of ICI-5, N=4 Turbo Receiver

Figure 1:
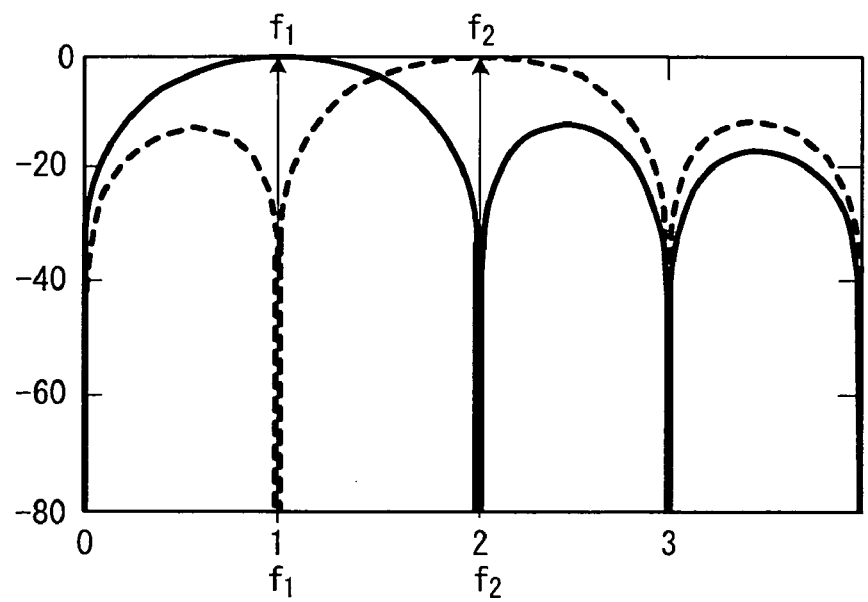
FIG. 1 shows frequency response characteristics for adjacent subchannels when the frequency offset a is zero.
Figure 2:
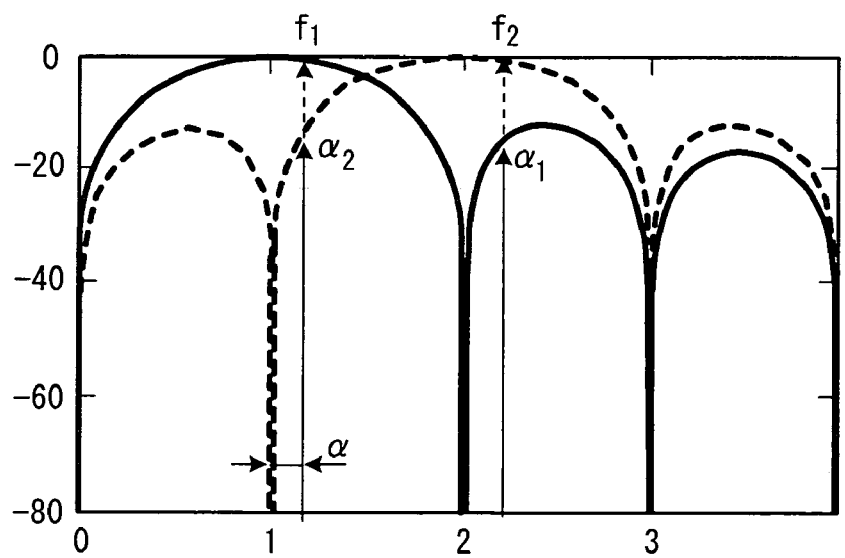
FIG. 2 shows frequency response characteristics for adjacent subchannels when the frequency offset a is not zero.
Figure 3:
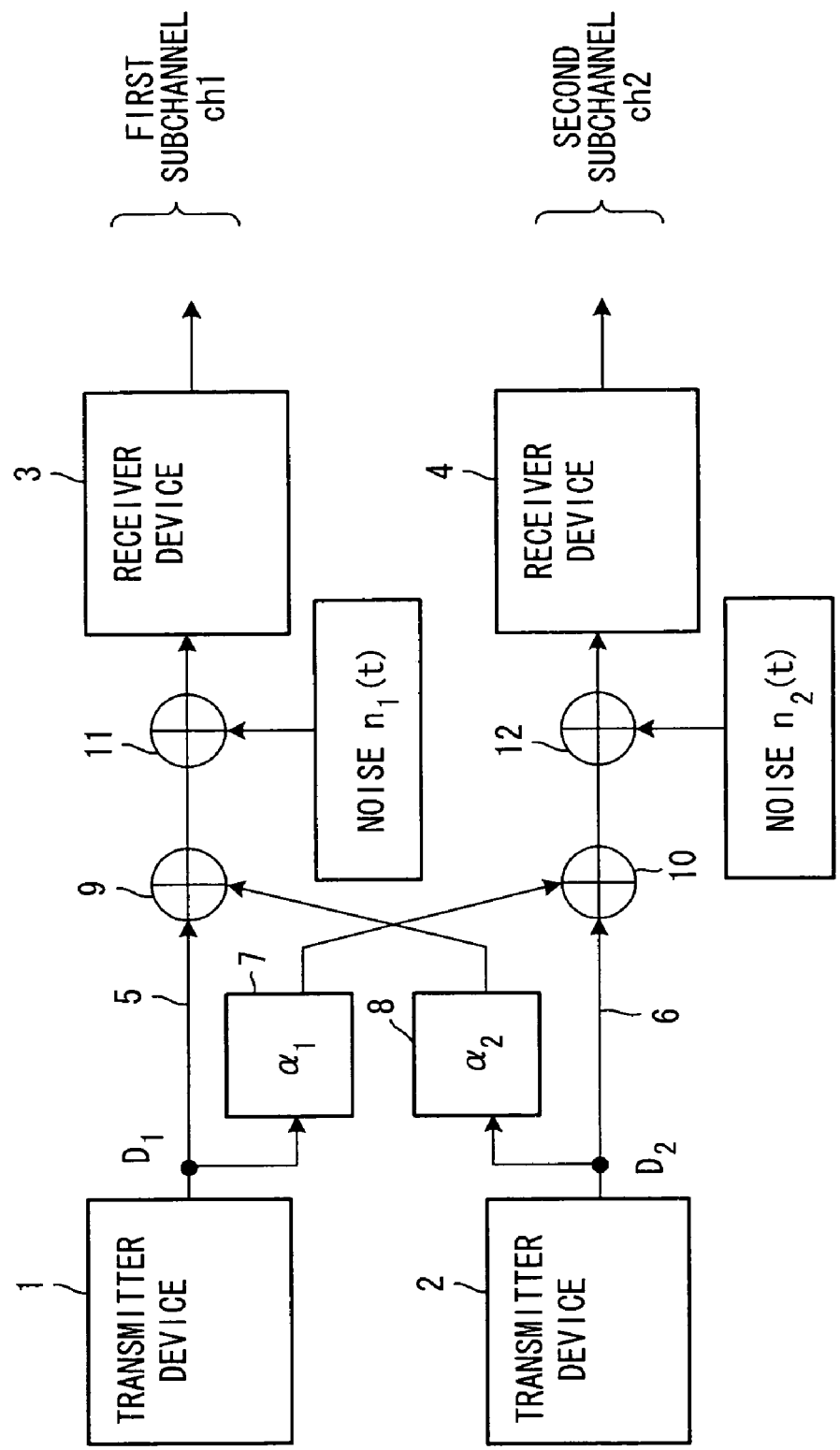
FIG. 3 is a general model for a multicarrier communication system in which ICI exists.
Figure 4:
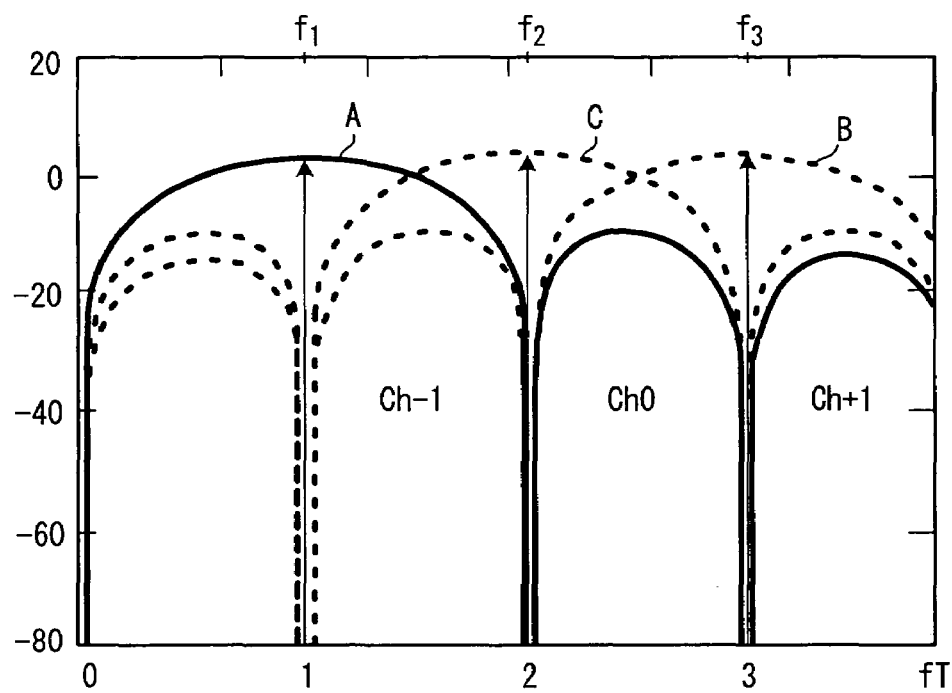
FIG. 4 shows frequency response characteristics for three subchannels when the frequency offset is zero.
Figure 5:
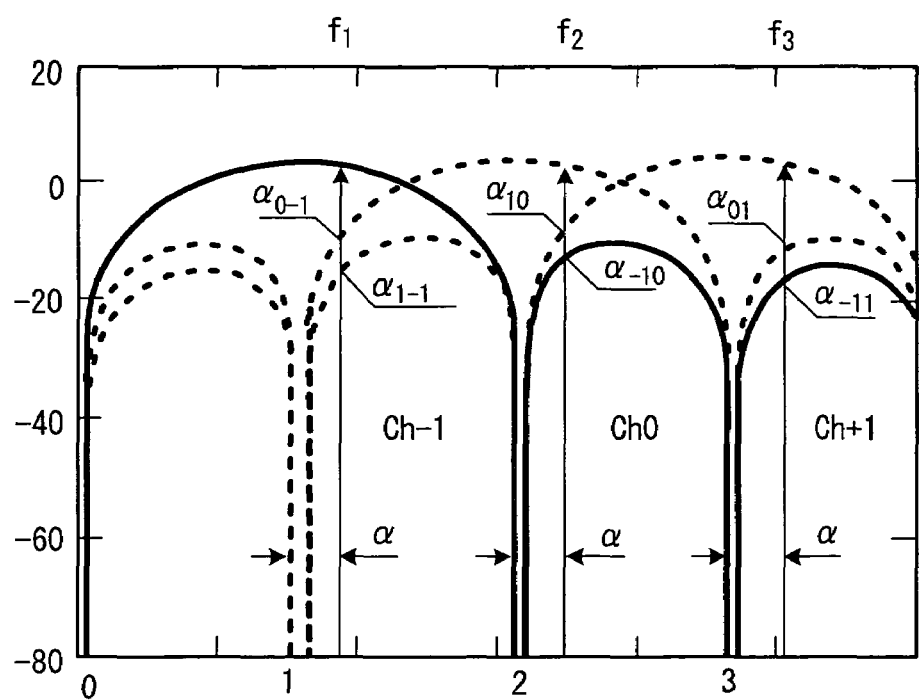
FIG. 5 shows frequency response characteristics for three subchannels when the frequency offset is not zero.
Figure 6:
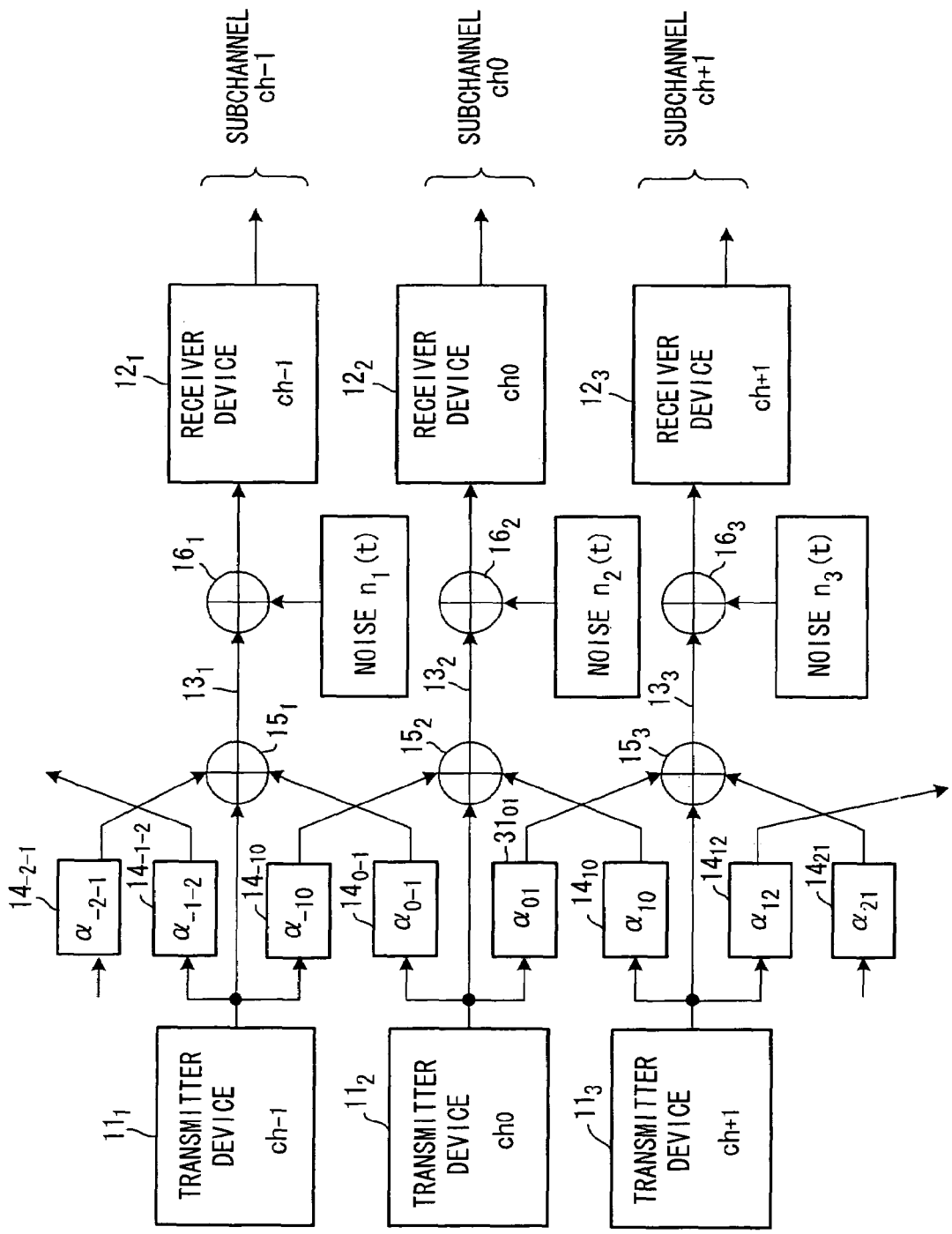
FIG. 6 is a general model serving to illustrate the mutual ICI of three subchannels in a communication system with a frequency offset.
Figure 7:
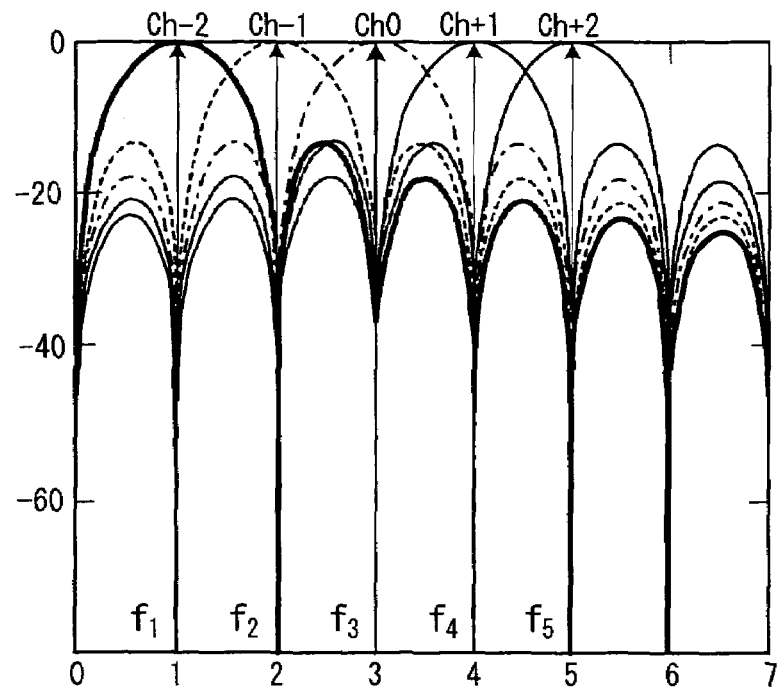
FIG. 7 shows frequency response characteristics for five subchannels Ch−2 to Ch+2 when the frequency offset is zero.
Figure 8:
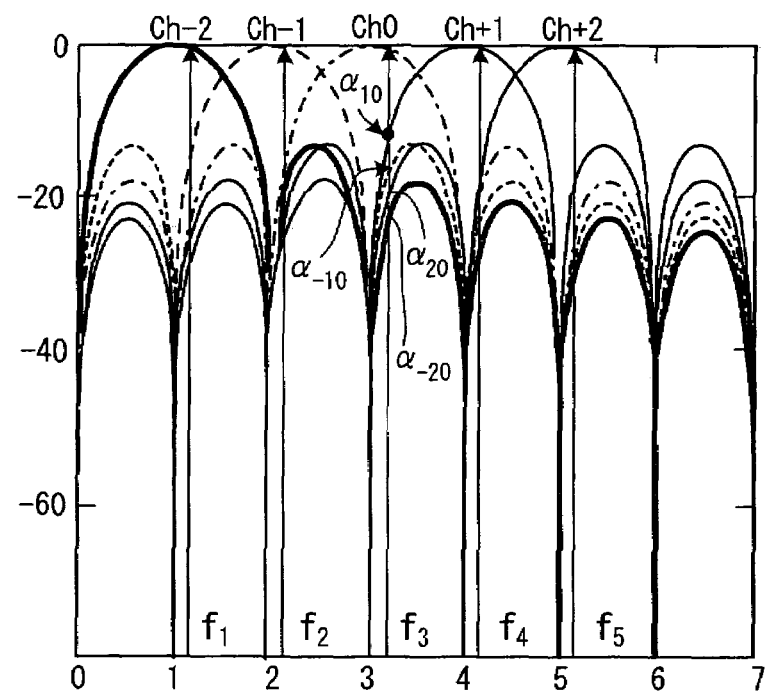
FIG. 8 shows frequency response characteristics for five subchannels Ch−2 to Ch+2 when the frequency offset is not zero.
Figure 9:
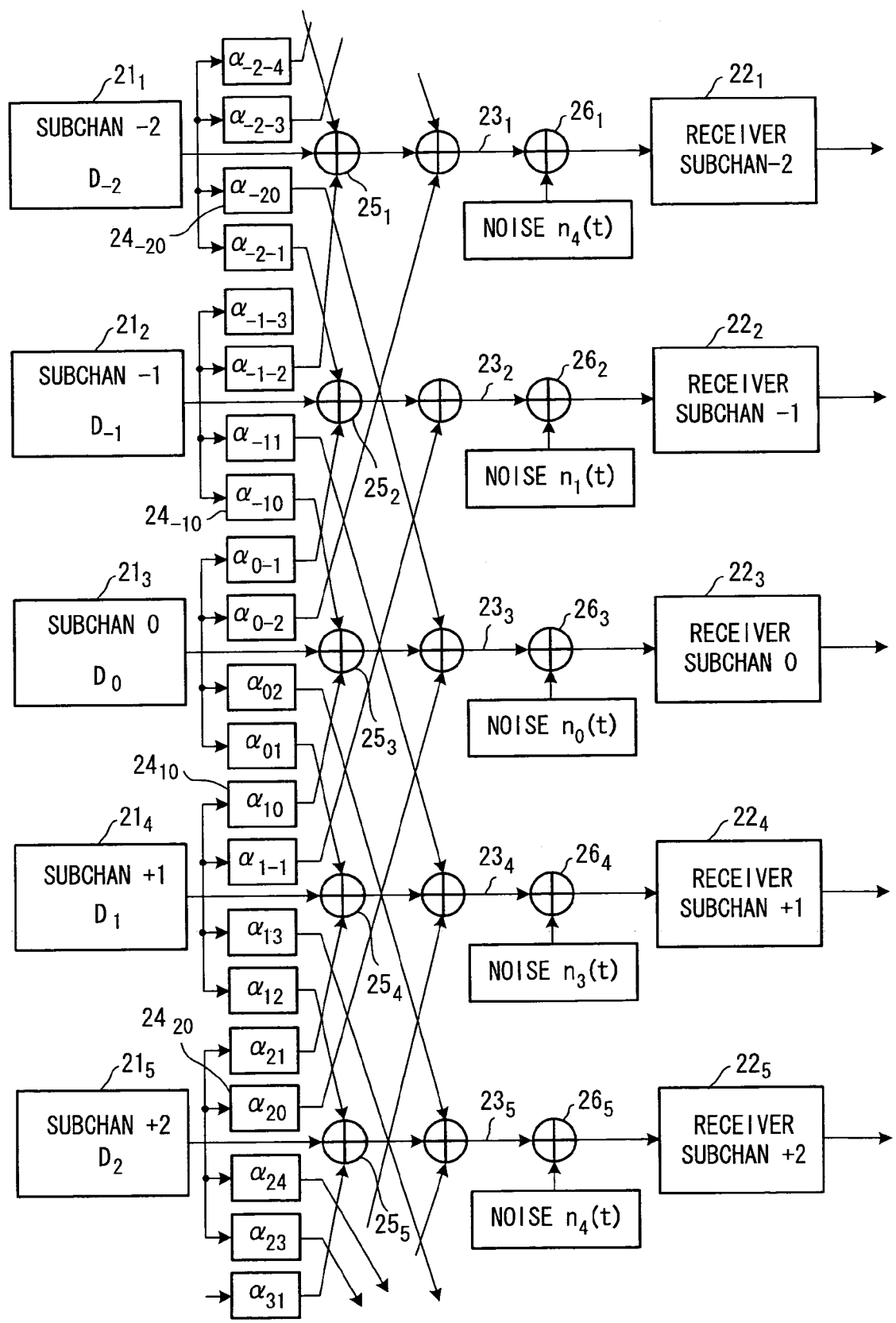
FIG. 9 is a general model serving to illustrate the mutual ICI of five subchannels in a communication system with a frequency offset.
Figure 21:
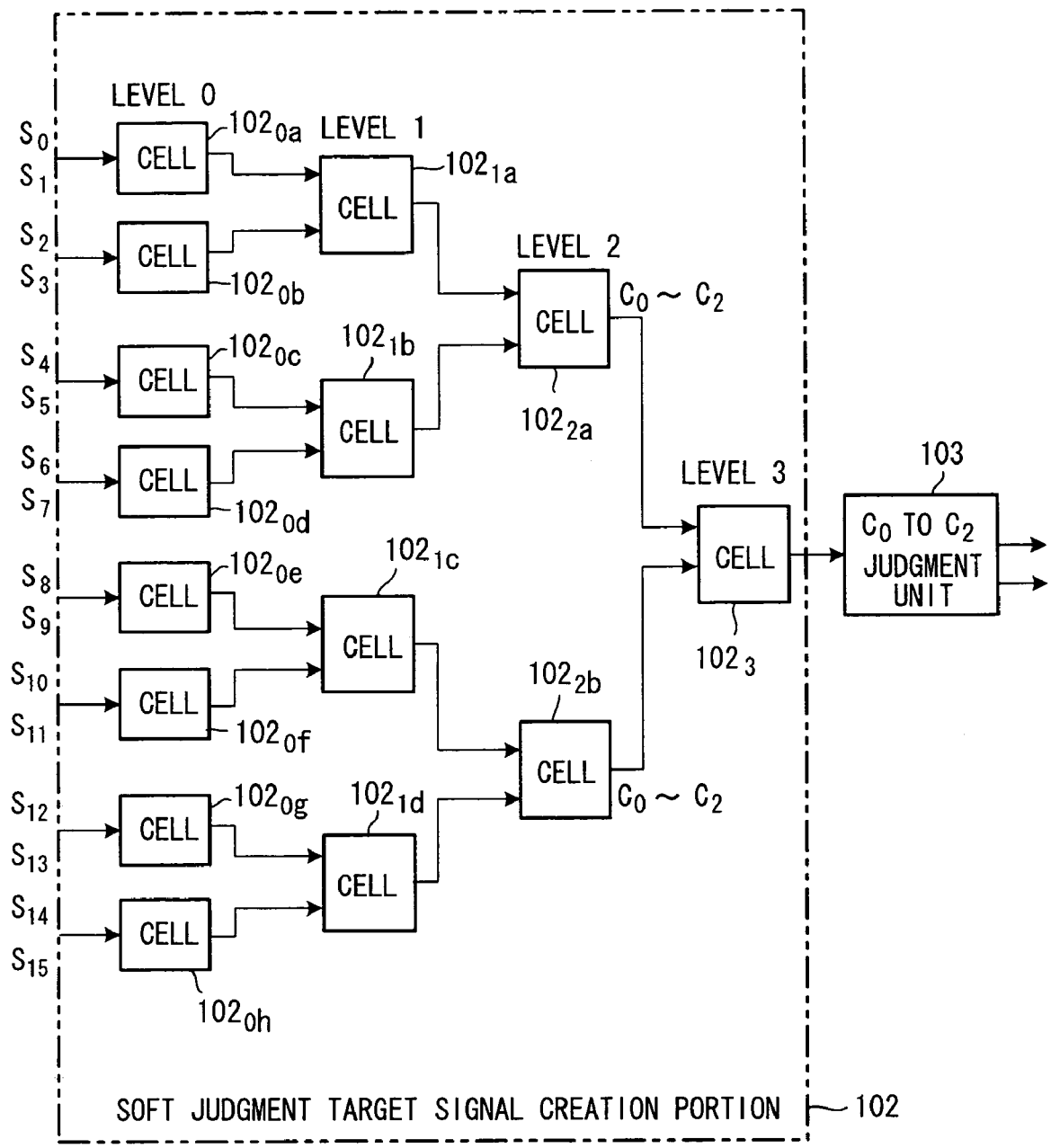
FIG. 21 is a constitutional view of the soft judgment target signal creation portion of an ICI-5, N=4 turbo receiver.

Similarly, the soft judgment target signal creation portion of an ICI-5, N=4 (see FIG. 9) turbo receiver can be constituted as shown in FIG. 21. The soft judgment target signal creation portion 102 comprises $2^N-1=15$ cells and is constituted by hierarchically connecting eight level-0 cells $102_{0a}$ to $102_{0h}$, four level-1 cells $102_{1a}$ to $102_{1d}$, two level-2 cells $102_{2a}$ to $102_{2b}$ and one level-3 cell $102_3$. That is, the level-3 cell $102_3$ receives the soft judgment target signals $C_0$ to $C_2$ of the first cell $102_{2a}$ of level 2 as the input signals $A_0$, $B_1$ and $A_2$, receives the soft judgment target signals $C_0$ to $C_2$ of the second cell $102_{2b}$ of level 2 as the input signals $B_0$, $A_1$ and $B_2$, produces the soft judgment target signals $C_0$ to $C_2$ of level 3, and corrects the soft judgment target signals $C_0$ to $C_2$ by means of the soft judgment value of another subchannel excluding the target subchannel before inputting the corrected signals to the judgment unit 103.

The input signals $S_0$ to $S_{15}$ of the cells $102_{0a}$ to $102_{0d}$ of level 0 are correlator output signals that are defined by the following equations:

$$S_0 = (1 + a_{-20} + a_{-10} + a_{+10} + a_{+20}) \quad S_8 = (1 - a_{-20} + a_{-10} + a_{+10} + a_{+20})$$
$$S_1 = (1 + a_{-20} + a_{-10} + a_{+10} - a_{+20}) \quad S_9 = (1 - a_{-20} + a_{-10} + a_{+10} - a_{+20})$$
$$S_2 = (1 + a_{-20} + a_{-10} - a_{+10} + a_{+20}) \quad S_{10} = (1 - a_{-20} + a_{-10} - a_{+10} + a_{+20})$$
$$S_3 = (1 + a_{-20} + a_{-10} - a_{+10} - a_{+20}) \quad S_{11} = (1 - a_{-20} + a_{-10} - a_{+10} - a_{+20})$$
$$S_4 = (1 + a_{-20} - a_{-10} + a_{+10} + a_{+20}) \quad S_{12} = (1 - a_{-20} - a_{-10} + a_{+10} + a_{+20})$$
$$S_5 = (1 + a_{-20} - a_{-10} + a_{+10} - a_{+20}) \quad S_{13} = (1 - a_{-20} - a_{-10} + a_{+10} - a_{+20})$$
$$S_6 = (1 + a_{-20} - a_{-10} - a_{+10} + a_{+20}) \quad S_{14} = (1 - a_{-20} - a_{-10} - a_{+10} + a_{+20})$$
$$S_7 = (1 + a_{-20} - a_{-10} - a_{+10} - a_{+20}) \quad S_{15} = (1 - a_{-20} - a_{-10} - a_{+10} - a_{+20}).$$

(c) Soft Judgment Target Signal Creation Portion of ICI-N Turbo Receiver

Figure 22:
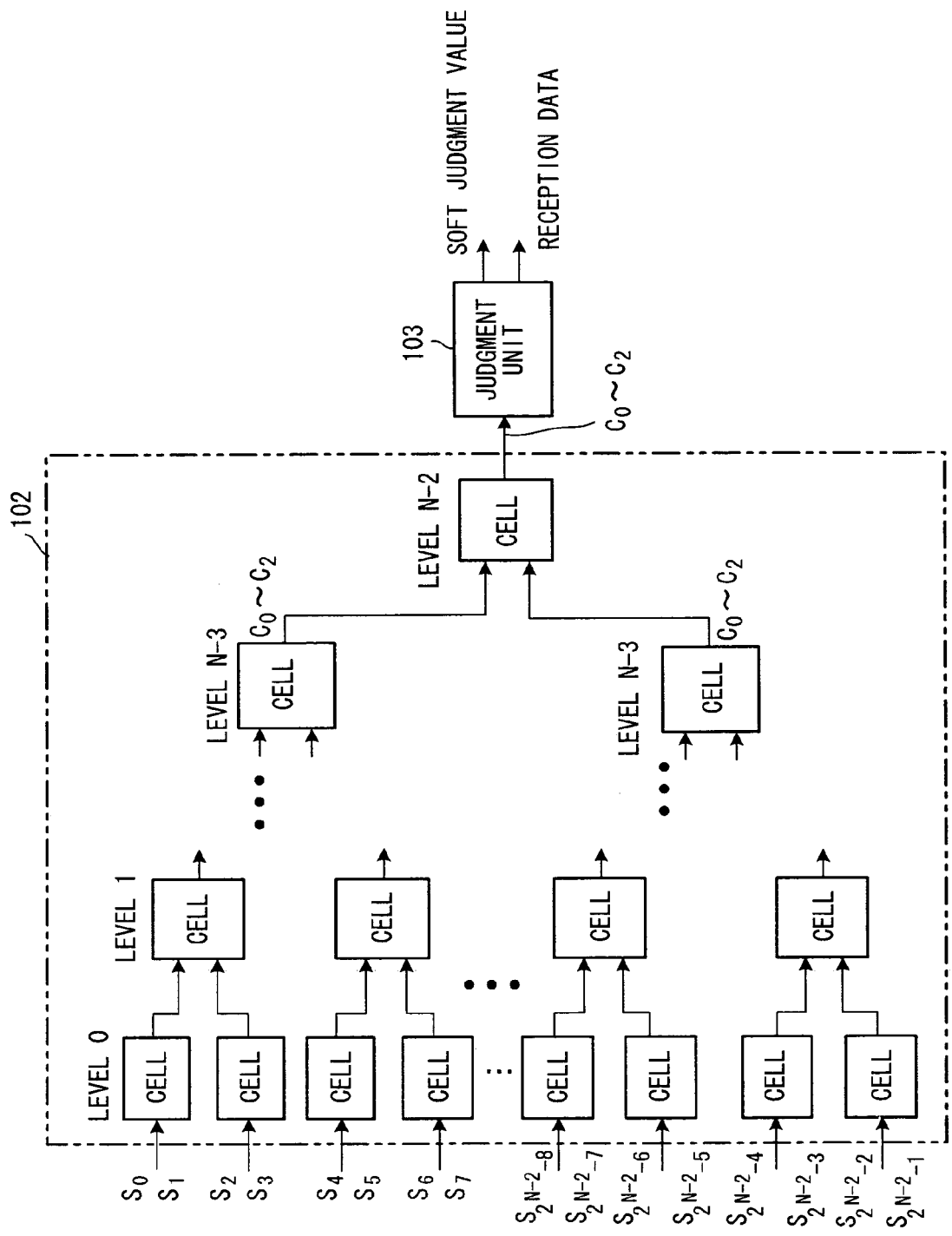
FIG. 22 is a constitutional view of the soft judgment target signal creation portion of an ICI-N turbo receiver in which the number of crosstalk paths=N−1.
Figure 23:
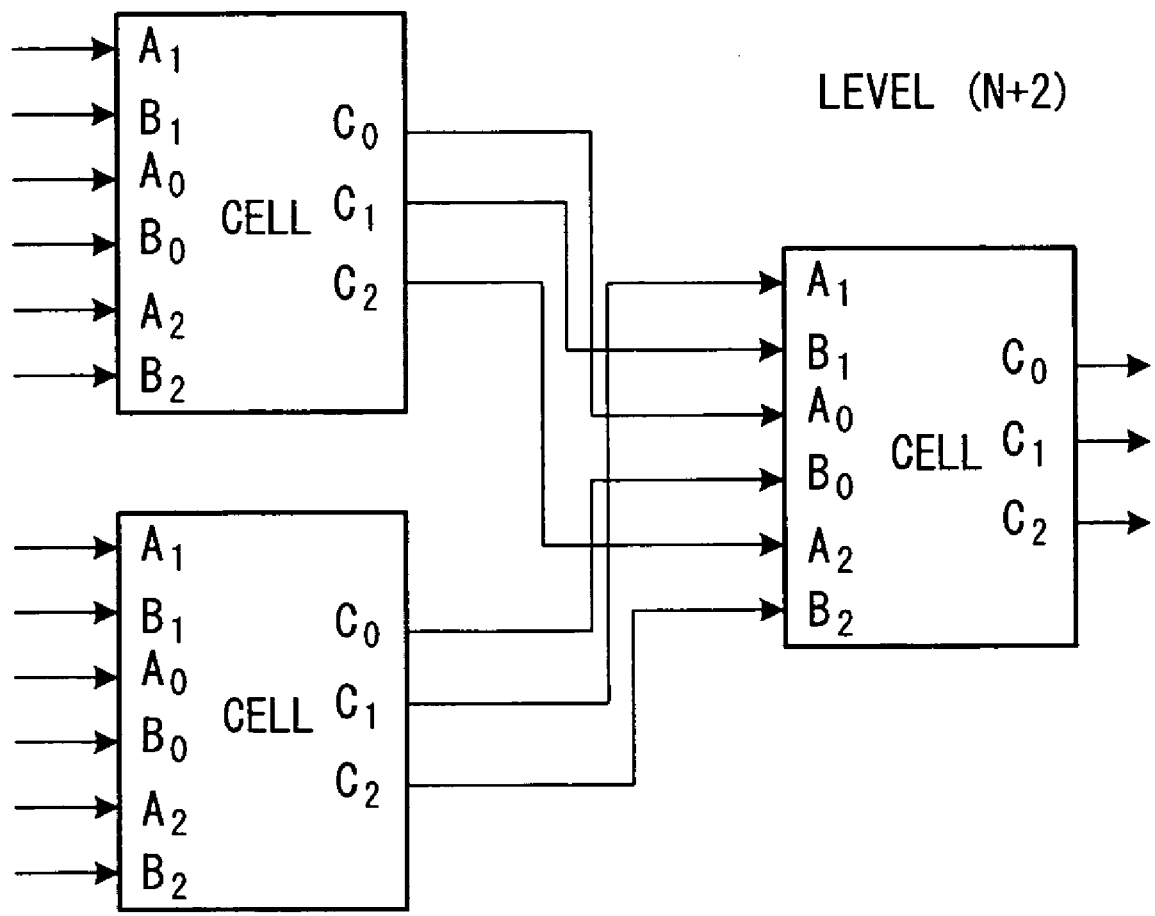
FIG. 23 is an explanatory view of the cell connection constitution.

Generally, the soft judgment target signal creation portion of an ICI-N turbo receiver in which the crosstalk path number=N−1 can be constituted as shown in FIG. 22. The soft judgment target signal creation portion 102 comprises $2^{N-1}-1$ cells and is constituted by hierarchically connecting $2^{N-2}$ level-0 cells, $2^{N-3}$ level-1 cells, two level (N−3) cells, and one level (N−2) cell. That is, as shown in FIG. 23, the level (N−2) cell receives the soft judgment target signals $C_0$ to $C_2$ of the first cell of level (N−3) as the input signals $A_0$, $B_1$ and $A_2$, receives the soft judgment target signals $C_{0\ to\ C2}$ of the second cell of level (N−3) as the input signals $B_0$, $A_1$ and $B_2$, produces the soft judgment target signals $C_0$ to $C_2$ of level (N−2) and corrects the soft judgment target signals $C_0$ to $C_2$ by means of the soft judgment value of another subchannel excluding the target subchannel and inputs the corrected signals to the judgment unit 103.

The input signal to the $2^{N-1}$ level-0 cells are correlator output signals that are defined by the following equations:

$$S_0 = \begin{pmatrix} 1 + \alpha_{-\frac{N}{2},0} + \alpha_{-\frac{N}{2}+1,0} + \alpha_{-\frac{N}{2}+2,0} + \cdots + \alpha_{-10} + \\ \alpha_{+10} + \cdots + \alpha_{+\frac{N}{2}-1,0} + \alpha_{+\frac{N}{2},0} \end{pmatrix} \quad (60)$$

$$S_1 = \begin{pmatrix} 1 + \alpha_{-\frac{N}{2},0} + \alpha_{-\frac{N}{2}+1,0} + \alpha_{-\frac{N}{2}+2,0} + \cdots + \alpha_{-10} + \\ \alpha_{+10} + \cdots + \alpha_{+\frac{N}{2}-1,0} - \alpha_{+\frac{N}{2},0} \end{pmatrix}$$

$$S_1 = \begin{pmatrix} 1 + \alpha_{-\frac{N}{2},0} + \alpha_{-\frac{N}{2}+1,0} + \alpha_{-\frac{N}{2}+2,0} + \cdots + \alpha_{-10} + \\ \alpha_{+10} + \cdots - \alpha_{+\frac{N}{2}-1,0} - \alpha_{+\frac{N}{2},0} \end{pmatrix}$$

$$S_0 = \begin{pmatrix} 1 - \alpha_{-\frac{N}{2},0} - \alpha_{-\frac{N}{2}+1,0} - \alpha_{-\frac{N}{2}+2,0} - \cdots - \alpha_{-10} - \\ \alpha_{+10} - \cdots - \alpha_{+\frac{N}{2}-1,0} - \alpha_{+\frac{N}{2},0} \end{pmatrix}$$

(d) Cell Soft Judgment Value and Energy Difference Δ

In the cell shown in FIG. 18, $D_{SOFT}$ is the soft judgment value and Δ is the energy difference. More specifically, the soft judgment value $D_{SOFT}$ of a level-L cell is the soft judgment value that is outputted by the judgment unit of subchannel L. A subchannel signal is obtained by adding signals in order starting from 0 to the subchannel producing crosstalk. For example, in the case of ICI-3 in FIG. 12, ch+1 is subchannel 0 and ch−1 is subchannel 1.

Δ of the first cell of level 0 is $(E_0-E_1)/N_0$, Δ of the second cell is $(E_2-E_3)/N_0$, Δ of the third cell is $(E_4-E_5)/N_0$, and, generally, Δ of the nth cell is $(E_n-E_{n+1})/N_0$. $N_0$ is the power spectral strength of noise.

Δ of the first cell of level 1 is $0.5\times\{(E_0+E_1)-(E_2+E_3)\}/N_0$, Δ of the second cell is $0.5\times\{(E_4+E_5)-(E_6+E_7)\}/N_0$, Δ of the third cell is $0.5\{(E_8-E_9)-(E_{10}+E_{11})\}/N_0$, and, generally, Δ of the nth cell of level 1 is $0.5\{(E_n+E_{n+1})-(E_{n+2}+E_{n+3})\}/N_0$. Δ of the nth cell of level L is:

$$\Delta = 0.5^{L-1}\{(E_n+E_{n+1}+\ldots E_{n+L})-(E_{n+L+1}+E_{n+L+2}+\ldots E_{n+2L})\}/N_0.$$

(E) Application to DMT System

A DMT-based communication system may be considered as a practical application of the turbo receiver of the present invention. FIG. 23 is a constitutional view of the DMT-based communication system that adopts this turbo receiver and has a constitution in which the turbo receiver of the present invention is disposed downstream of the FFT portion of the receiver of a commonly known DMT communication system.

Figure 24:
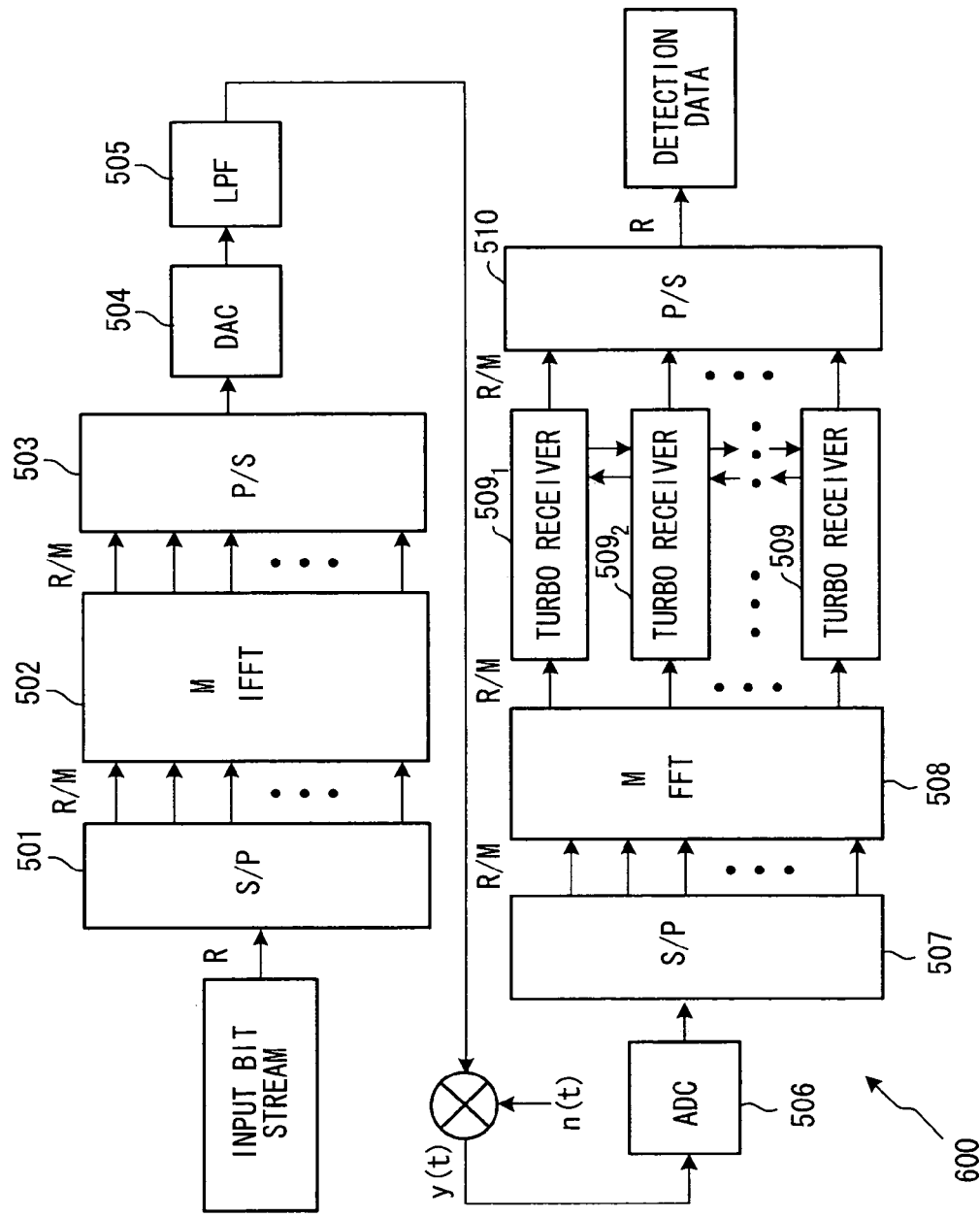
FIG. 24 is a constitutional view of a DMT-based communication system that adopts a turbo receiver.

In the communication system in FIG. 24, a serial/parallel converter (S/P) 501 converts an input bit stream with a data rate R (bits/sec:bps) into parallel data of M bits and transfers each bit via M parallel subchannels at a new rate R/M (bps). An M-point IFFT 502 joins the M parallel data and converts same into a sample signal of a time region. A parallel/serial converter (P/S) 503 converts the N samples into serial format and inputs the serial data to a digital/analog converter (DAC) 504 in series. The output signal of a low pass filter (LPF) 50 on the DAC-output side is a serial time DMT signal. In a White Gaussian noise channel, a transmission DMT signal degrades as a result of White Gaussian noise n(t) before being sent to the DMT receiver 600.

The receiver executes functions that are the opposite of those of the transmitter. That is, an analog/digital converter (ADC) 506 AD-converts the reception signal, a serial/parallel converter (S/P) 507 converts the digital signal into M parallel data and then inputs the M parallel data to an FFT 508. The FFT 508 performs FFT processing and demodulates the signal sent on each subchannel as an M matched filter array. Turbo receivers $509_1$ to $509_m$ of the present invention perform data judgment processing for the subchannel based on a turbo algorithm and the parallel/serial converter (P/S) 510 converts the signals obtained by each turbo receiver into serial data and outputs same as detected data. As a result of the above, the BER can be improved even when a frequency offset exists.

Figure 25:
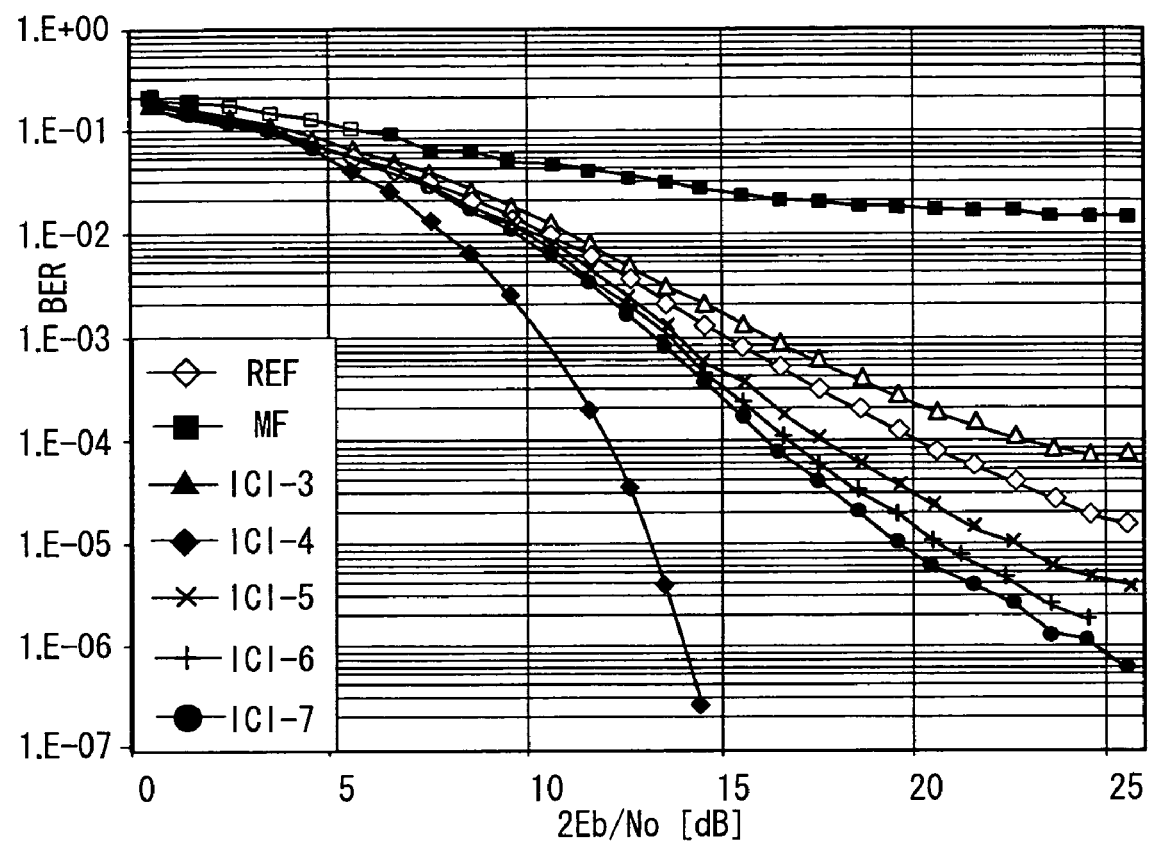
FIG. 25 is a BER performance of the DMT receiver of the present invention.

FIG. 25 shows the BER performance (MF) of a conventional DMT-based receiver and shows the BER performance of a DMT receiver that comprises the turbo processing function of the present invention and which repeats six turbos by means of M=64. Further, the BER performance is shown relative to $2E_b/N_0$ with a frequency offset a, which is normalized by means of the interchannel frequency, of 0.25. Furthermore, the BER in an ideal state in which ICI is not produced is shown as REF.

As is clear from FIG. 25, the BER performance of the turbo algorithm of the present invention increases each time the number of crosstalk paths to be considered (crosstalk subchannel number) increases. Further, because the present invention has a cell constitution, a turbo algorithm can be implemented simply even when there is an increase in the number of crosstalk subchannels to be considered.

What is claimed is:

1. A receiver device in a multicarrier communication system, which transmits data individually via a plurality of subchannels, the receiver device comprising:

a correlator that computes correlations between two reference signals and a reception signal of a target subchannel respectively, the reference signals being generated on the basis of combinations of crosstalk coefficients that express crosstalk from another subchannel;

a soft judgment target signal creation portion with a hierarchical structure rendered by forming a level-0 cell such that a level-0 soft judgment target signal is produced using two correlation signals inputted from the correlator and the soft judgment target signal is corrected by means of a soft judgment value of another subchannel excluding the target subchannel, forming a level-1 cell such that a level-1 soft judgment target signal is produced using a soft judgment target signals respectively inputted from each of two sets of level-0 cells and the soft judgment target signal is corrected by means of a soft judgment value of another subchannel excluding the target subchannel and, subsequently, similarly, forming a level (N+1) cell by using two sets of level-N cells; and a judgment unit that outputs a soft judgment value of the target subchannel by using the soft judgment target signal outputted by the level (N+1) cell and judges the reception signal of the target subchannel on the basis of the soft judgment value.

2. The receiver device according to claim 1, wherein one correlator is provided in correspondence with each of the level-0 cells constituting the soft judgment target signal creation portion; and each correlator computes correlations between the two reference signals and the reception signal of the target subchannel respectively, the reference signals being generated on the basis of the mutually different combinations of crosstalk coefficients, and inputs the computed correlation signals to the corresponding level-0 cell.

3. The receiver device according to claim 1, wherein each of the cells from level 0 to level N of the soft judgment target signal creation portion is constituted by an identical cell module.

4. The receiver device according to claim 3, wherein when a soft judgment target signal creation portion with a crosstalk subchannel number of one is formed by using a level-0 cell and a soft judgment target signal creation portion with a crosstalk subchannel number of two is formed by a level-0 cell and a level-1 cell, the level-1 cell is constituted by said cell module.

5. The receiver device according to claim 3, wherein a level-L cell comprises:

a correction portion which, when numbers are assigned in order to crosstalk subchannels, corrects the soft judgment target signal on the basis of the soft judgment value of an L-th subchannel.

6. The receiver device according to claim 3, wherein a level-L cell comprises:

a reflection portion that reflects the ratio between a noise and an energy of the reference signal on the soft judgment target signal value.

7. The receiver device according to claim 1, wherein the judgment unit creates a soft judgment value by combining a plurality of soft judgment target signals that are inputted by the cells of the final level of the soft judgment target signal creation portion and distinguishes data received from the target subchannel on the basis of the soft judgment value.

8. The receiver device according to claim 1, wherein the receiver device is provided in correspondence with each subchannel downstream of an FFT conversion processing of a DMT receiver.

* * * * *